US012623386B2

(12) United States Patent
Mizunashi et al.

(10) Patent No.: US 12,623,386 B2
(45) Date of Patent: May 12, 2026

(54) CONTROLLER OF INJECTION MOLDING MACHINE, INJECTION MOLDING MACHINE, AND RECORDING MEDIUM

(71) Applicant: SUMITOMO HEAVY INDUSTRIES, LTD., Tokyo (JP)

(72) Inventors: Takuya Mizunashi, Chiba (JP); Takasue Yamaguchi, Chiba (JP); Daigo Hotta, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/821,864

(22) Filed: Aug. 24, 2022

(65) Prior Publication Data

US 2023/0069010 A1 Mar. 2, 2023

(30) Foreign Application Priority Data

Aug. 27, 2021 (JP) ................................. 2021-139331

(51) Int. Cl.
*B29C 45/76* (2006.01)
*B29C 45/00* (2006.01)

(52) U.S. Cl.
CPC ...... *B29C 45/76* (2013.01); *B29C 2045/7606* (2013.01); *B29C 2945/76913* (2013.01); *B29C 2945/76939* (2013.01)

(58) Field of Classification Search
CPC ............ B29C 45/76; B29C 2045/7606; B29C 2945/76913; B29C 2945/76939; B29C 45/1774; B29C 45/77
See application file for complete search history.

(56) References Cited

U.S. PATENT DOCUMENTS

| | | | |
|---|---|---|---|
| 5,173,223 A | 12/1992 | Kamiguchi et al. | |
| 2003/0082255 A1* | 5/2003 | Konishi | B29C 45/76 |
| | | | 425/173 |
| 2004/0051194 A1 | 3/2004 | Yamazaki et al. | |
| 2022/0212386 A1* | 7/2022 | Arita | B29C 45/03 |

FOREIGN PATENT DOCUMENTS

| | | |
|---|---|---|
| JP | S59-217119 | 12/1984 |
| JP | H03-155915 | 7/1991 |
| JP | H06-039889 | 2/1994 |
| JP | H06-297532 | 10/1994 |

(Continued)

*Primary Examiner* — Alison L Hindenlang
*Assistant Examiner* — Shibin Liang
(74) *Attorney, Agent, or Firm* — IPUSA, PLLC

(57) ABSTRACT

A controller of an injection molding machine includes an acquisition part configured to acquire signals from a detection device that detects an operation of the injection molding machine, a reading part configured to read a file representing a past performance value which is a detection result of operations of the injection molding machine or of another injection molding machine from a storage medium in accordance with a manipulation received by an operating device, and an output part configured to output a screen including first waveform information that represents a change of the past performance value indicated in the file and second waveform information that represents a change of a performance value indicated by the signals acquired by the acquisition part.

9 Claims, 9 Drawing Sheets

(56)            References Cited

FOREIGN PATENT DOCUMENTS

| JP | H11-309767 | 11/1999 | | |
|----|------------|---------|---|---|
| JP | 2001-287254 | 10/2001 | | |
| JP | 2003-200456 | 7/2003 | | |
| JP | 2004-106272 | 4/2004 | | |
| JP | 2004-155065 | 6/2004 | | |
| JP | 2005-028894 | 2/2005 | | |
| JP | 2006-341501 | 12/2006 | | |
| JP | 2007-196604 | 8/2007 | | |
| JP | 2008-155516 | 7/2008 | | |
| JP | 2009-000929 | 1/2009 | | |
| WO | 2021060501 | * 4/2021 | ............ | B22D 17/32 |

* cited by examiner

START

/S1901

RECEIVE THE PRESSING DOWN
OF FILE REFERENCE MODE

/S1902

RECEIVE SELECTED FILE

/S1903

READ SELECTED FILE

/S1904

ACQUIRE SIGNALS

/S1905

OUTPUT WAVEFORM DATA REPRESENTED
BY THE SELECTED FILE AND WAVEFORM DATA
REPRESENTED BY SIGNALS BEING
CURRENTLY INPUT

END

CONTROLLER OF INJECTION MOLDING MACHINE, INJECTION MOLDING MACHINE, AND RECORDING MEDIUM

CROSS-REFERENCE TO RELATED APPLICATIONS

The present application is based on and claims priority under 35 U.S.C. 119 to Patent Application No. 2021-139331 filed on Aug. 27, 2021 with the Japan Patent Office, the entire contents of Japanese Patent Application No. 2021-139331 are hereby incorporated by reference.

BACKGROUND OF THE INVENTION

1. Field of the Invention

The present invention relates to a controller of injection molding machine, an injection molding machine, and a recording medium.

2. Description of the Related Art

Various sensors have conventionally been installed in injection molding machines. Therefore, in injection molding machines, a technique has been proposed to display various processes during injection molding based on detection signals from sensors or to display waveform data representing settings made by a user, on a display device.

In recent years, various techniques have been proposed to display waveform data on the display device of injection molding machines. For example, a conventional technique proposes a technology that can display waveform data in two areas simultaneously.

SUMMARY

One aspect of the present invention provides a technique that can realize appropriate quality control by displaying waveform information that shows past sensor performance values selected by a user, and by displaying waveform information that shows current sensor performance values, enabling the user to properly understand the process performed in the current process.

One aspect of the present invention is to provide a controller of an injection molding machine including an acquisition part configured to acquire signals from a detection device that detects an operation of the injection molding machine, a reading part configured to read a file representing a past performance value which is a detection result of operations of the injection molding machine or of another injection molding machine from a storage medium in accordance with a manipulation received by an operating device, and an output part configured to output a screen including first waveform information that represents a change of the past performance value indicated in the file and second waveform information that represents a change of a performance value indicated by the signals acquired by the acquisition part.

Figure 1:
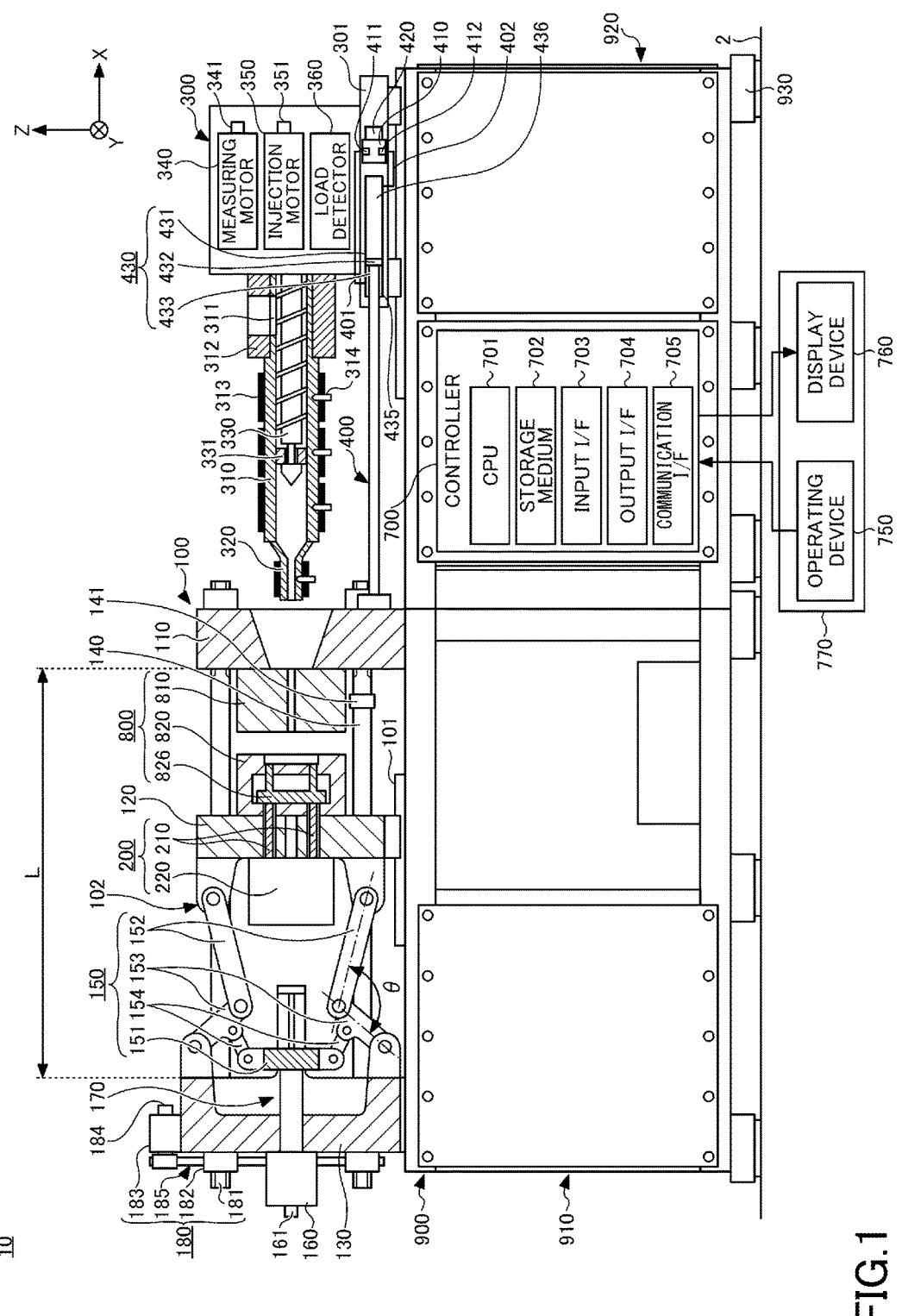
FIG. 1 illustrates a state of an injection molding machine according to a first embodiment when opening of a mold is completed.

In conventional technique, the timing for starting the display of waveform information is triggered by a change in sensor output. However, in the conventional technique, the display is updated with waveform data based on current sensor performance values, and there is no consideration of displaying waveform data of past sensor performance values, selected as desired by the user.

According to one aspect, the present invention can provide a technique that can realize appropriate quality control by understanding a process performed in the current process.

Hereinafter, an embodiment of the invention will be described with reference to drawings. In each drawing, the same or corresponding reference numerals are assigned to the same or corresponding configurations, and descriptions thereof are omitted.

Figure 2:
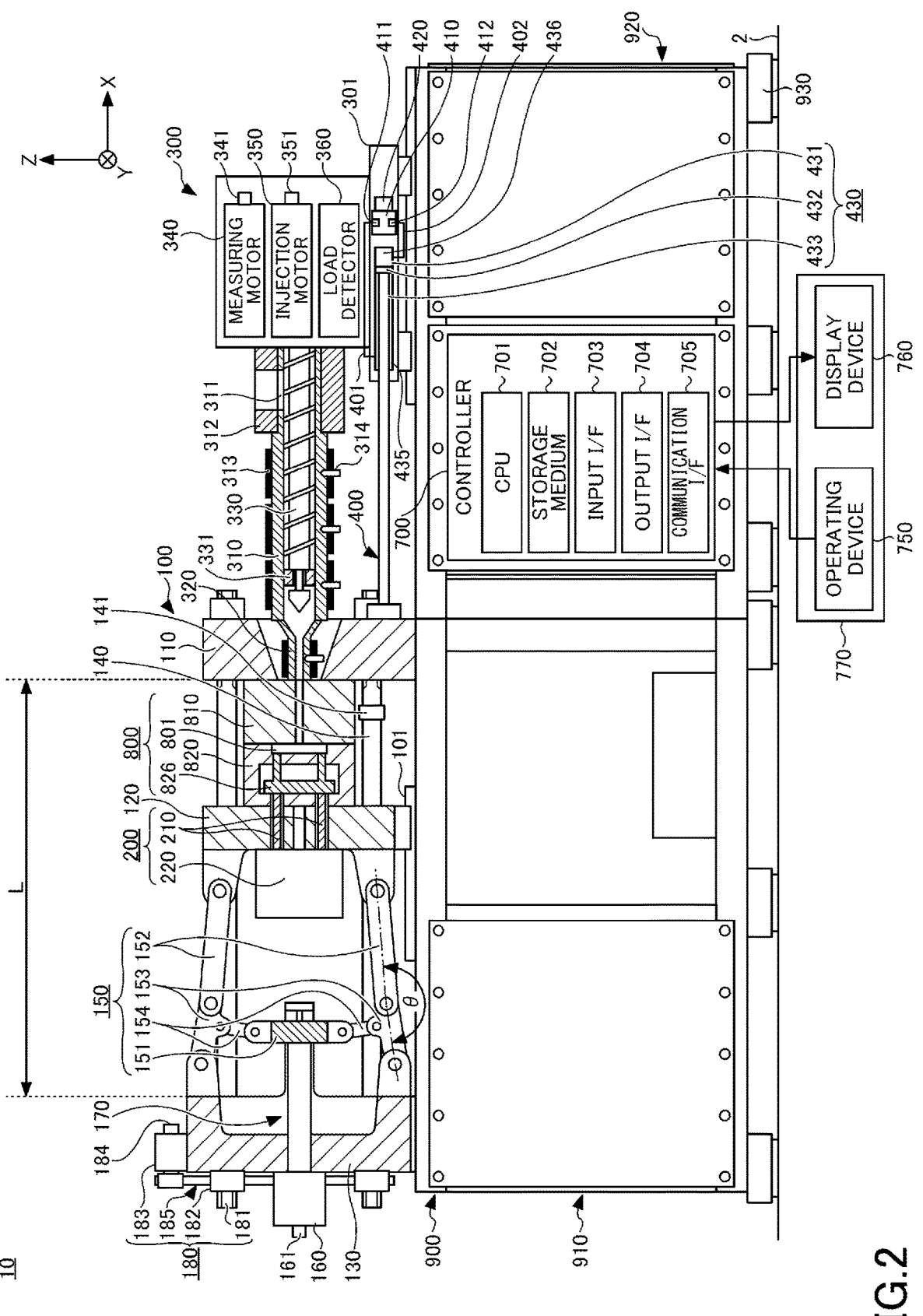
FIG. 2 illustrates a state of the injection molding machine according to the first embodiment when the mold is clamped.

FIG. 1 is a view illustrating a state when a mold opening of an injection molding machine according to a first embodiment is completed. FIG. 2 is a view illustrating a state when a mold of the injection molding machine according to the first embodiment is clamped. In this specification, an X-axis direction, a Y-axis direction, and a Z-axis direction are directions perpendicular to each other. The X-axis direction and the Y-axis direction represent a horizontal direction, and the Z-axis direction represents a vertical direction. When a mold clamping device 100 is a horizontal type, the X-axis direction is a mold opening and closing direction and the Y-axis direction is a width direction of an injection molding machine 10. A negative side in the Y-axis direction is referred to as an operation side, and a positive side in the Y-axis direction is referred to as a non-operation side.

As illustrated in FIGS. 1 and 2, the injection molding machine 10 includes a mold clamping device 100 that opens and closes a mold device 800, an ejector device 200 that ejects a molded article molded by the mold device 800, an injection device 300 that injects a molding material into the mold device 800, a moving device 400 that moves the injection device 300 forward and backward against the mold device 800, a controller 700 that controls each component of the injection molding machine 10, and a frame 900 that supports each component of the injection molding machine 10. The frame 900 includes a mold clamping device frame 910 supporting the mold clamping device 100 and an injection device frame 920 supporting the injection device 300. The mold clamping device frame 910 and the injection device frame 920 are respectively installed on the floor 2 via a leveling adjuster 930. The controller 700 is placed in the internal space of the injection device frame 920. Each component of the injection molding machine 10 is described below.

(Mold Clamping Device)

In descriptions of the mold clamping device 100, a movement direction (for example, X-axis positive direction) of a movable platen 120 at the time of mold closing is defined as a front side, and a movement direction (for example, X-axis negative direction) of the movable platen 120 at the time of mold opening is defined as a rear side.

The mold clamping device 100 performs mold closing, pressure-boosting, mold clamping, depressurizing, and mold opening of a mold device 800. The mold device 800 includes a fixed mold 810 and a movable mold 820. The mold clamping device 100 is horizontal, for example, and the mold opening and closing direction is horizontal. The mold clamping device 100 has a fixed platen 110 to which a fixed mold 810 is attached, the movable platen 120 to which the movable mold 820 is attached, and a moving mechanism 102 for moving the movable platen 120 in the mold opening and closing direction relative to the fixed platen 110.

The fixed platen 110 is fixed to the mold clamping device frame 910. The fixed mold 810 is attached to the surface of the fixed platen 110 facing the movable platen 120.

The movable platen 120 is freely arranged in the mold opening and closing direction with respect to the mold clamping device frame 910. On the mold clamping device frame 910, a guide 101 is laid to guide the movable platen 120. The movable mold 820 is attached to the surface of the movable platen 120 facing the fixed platen 110.

The moving mechanism 102 moves the movable platen 120 forward and backward against the fixed platen 110 to close, pressure-boost, clamp, depressurize, and open the mold device 800. The moving mechanism 102 has a toggle support 130 spaced apart from the fixed platen 110, a tie bar 140 connecting the fixed platen 110 and the toggle support 130, a toggle mechanism 150 for moving the movable platen 120 in the mold opening and closing direction with respect to the toggle support 130, a mold clamping motor 160 for operating the toggle mechanism 150, a motion conversion mechanism 170 for converting the rotational motion of the mold clamping motor 160 into linear motion, and a mold thickness adjustment mechanism 180 for adjusting the spacing between the fixed platen 110 and the toggle support 130.

The toggle support 130 is spaced from the fixed platen 110 and mounted on the mold clamping device frame 910 so as to move freely in the mold opening and closing direction. The toggle support 130 may be movably arranged along a guide laid on the mold clamping device frame 910. The guide of the toggle support 130 may be the same as the guide 101 of the movable platen 120.

In the present embodiment, the fixed platen 110 is fixed to the mold clamping device frame 910 and the toggle support 130 is arranged freely in the mold opening and closing direction with respect to the mold clamping device frame 910, but the toggle support 130 may be fixed to the mold clamping device frame 910 and the fixed platen 110 may be arranged freely in the mold opening and closing direction with respect to the mold clamping device frame 910.

The tie bar 140 connects the fixed platen 110 and the toggle support 130 with an interval L in the mold opening and closing direction. Multiple tie bars 140 (for example, 4) may be used. The multiple tie bars 140 are arranged parallel to the mold opening and closing direction and extend according to the clamp force. At least one tie bar 140 may be provided with a tie bar strain detector 141 that detects strain in the tie bar 140. The tie bar strain detector 141 sends a signal indicating its detection result to the controller 700. The detection result of the tie bar strain detector 141 is used for the detection of clamp force or the like.

In the present embodiment, the tie bar strain detector 141 is used as the mold clamping force detector for detecting the clamp force, but the present invention is not limited to this. The clamping force detector is not limited to the strain gauge type, but may be piezoelectric, capacitive, hydraulic, electromagnetic, or the like, and its mounting position is not limited to the tie bar 140.

A toggle mechanism 150 is positioned between the movable platen 120 and the toggle support 130 to move the movable platen 120 relative to the toggle support 130 in the mold opening and closing direction. The toggle mechanism 150 has a crosshead 151 that moves in the mold opening and closing direction and a pair of link groups that bend and stretch by the movement of the crosshead 151. The pair of link groups have, respectively, a first link 152 and a second link 153 flexibly connected by pins or the like. The first link 152 is swingably attached to the movable platen 120 by a pin or the like. The second link 153 is swingably attached to the toggle support 130 by a pin or the like. The second link 153 is attached to the crosshead 151 via the third link 154. When the crosshead 151 is moved forward and backward against the toggle support 130, the first link 152 and the second link 153 are bent and stretched, and the movable platen 120 moves forward and backward against the toggle support 130.

The configuration of the toggle mechanism 150 is not limited to the configuration illustrated in FIGS. 1 and 2. For example, in FIGS. 1 and 2, the number of nodes in each link group is 5, but it may be 4, and one end of the third link 154 may be connected to the nodes of the first link 152 and the second link 153.

A mold clamping motor 160 is attached to the toggle support 130 to operate the toggle mechanism 150. The mold clamping motor 160 bends and stretches the first link 152 and the second link 153 by moving the crosshead 151 forward and backward against the toggle support 130, and moves the movable platen 120 forward and backward against the toggle support 130. The mold clamping motor 160 is directly connected to the motion conversion mechanism 170, but may be connected to the motion conversion mechanism 170 via a belt, pulley, and the like.

The motion conversion mechanism 170 converts the rotational motion of the mold clamping motor 160 into the linear motion of the crosshead 151. The motion conversion mechanism 170 includes a screw shaft and a screw nut that screws into the screw shaft. A ball or roller may be interposed between the screw shaft and the screw nut.

The mold clamping device 100 performs a mold closing process, a pressure-boosting process, a mold clamping process, a depressurizing process, a mold opening process, and the like under the control of the controller 700.

In the mold closing process, the mold clamping motor 160 is driven to move the crosshead 151 forward to the mold closing completion position at a set moving velocity, thereby forwarding the movable platen 120 and touching the movable mold 820 to the fixed mold 810. The position and moving velocity of the crosshead 151 are detected using, for example, a mold clamping motor encoder 161. The mold clamping motor encoder 161 detects the rotation of the mold clamping motor 160 and sends a signal indicating the result of the detection to the controller 700.

The crosshead position detector for detecting the position of the crosshead 151 and the crosshead moving velocity detector for detecting the moving velocity of the crosshead 151 are not limited to the mold clamping motor encoder 161, but general position detectors can be used. The movable platen position detector for detecting the position of the movable platen 120 and the movable platen moving velocity detector for detecting the moving velocity of the movable platen 120 are not limited to the mold clamping motor encoder 161, and general velocity detectors can be used.

In the pressure-boosting process, the mold clamping force is generated by further driving the mold clamping motor 160 to further move the crosshead 151 forward from the mold closing clamping position to the mold open clamping position.

In the mold clamping process, the mold clamping motor 160 is driven to maintain the position of the crosshead 151 in the mold clamping position. In the mold clamping process, the mold clamping force generated in the pressure-boosting process is maintained. In the mold clamping process, a cavity space 801 (see FIG. 2) is formed between the movable mold 820 and the fixed mold 810, and an injection device 300 fills the cavity space 801 with a liquid molding material. The filled molding material is solidified, resulting in a molded product.

The number of cavity spaces 801 may be one or more. In the latter case, several molded products are obtained simultaneously. An insert material may be placed in one part of the cavity space 801 and the other part of the cavity space 801 may be filled with a molding material. A molded product is obtained in which the insert material and the molding material are integrated.

In the depressurization process, the mold clamping motor 160 is driven to move the crosshead 151 backward from the mold closing clamping position to the mold opening starting position, thereby moving the movable platen 120 backward and reducing the mold clamping force. The mold opening start position and the mold closing completion position may be the same position.

In the mold opening process, the mold clamping motor 160 is driven to move the crosshead 151 backward from the mold opening start position to the mold opening completion position at a set moving velocity, thereby moving the movable platen 120 backward and separating the movable mold 820 from the fixed mold 810. An ejector device 200 then ejects the molded product from the movable mold 820.

The setting conditions in the mold closing, pressure-boosting, and clamping processes are collectively set as a series of setting conditions. For example, the moving velocity and position (includes mold closing starting position, moving velocity switching position, mold closing completion position, and mold clamping closing position) of the crosshead 151 and the mold clamping force in the mold closing and pressure-boosting processes are collectively set as a series of setting conditions. The mold closing starting position, the moving velocity switching position, the mold closing completion position, and the mold clamping position are arranged in this order from the rear side to the front side and represent the start and end points of the section where the moving velocity is set. For each section, a moving velocity is set. The moving velocity switching position may be one or more. The moving velocity switching position need not be set. Only one of the mold clamping position and the mold clamping force may be set.

Setting conditions in the depressurization process and mold opening process are similarly set. For example, the moving velocity and position (mold opening start position, moving velocity switching position, and mold opening completion position) of the crosshead 151 in the depressurization and mold opening processes are collectively set as a series of setting conditions. The mold opening start position, the moving velocity switching position, and the mold opening completion position are arranged in this order from the front to the rear and represent the start and end points of the section where the moving velocity is set. For each section, a moving velocity is set. The moving velocity switching position may be one or more. The moving velocity switching position need not be set. The mold opening start position and the mold closing completion position may be at the same position. The mold opening completion position and the mold closing start position may be the same.

The moving velocity and position of the movable platen 120 may be set instead of the moving velocity and position of the crosshead 151. The mold clamping force may also be set instead of the position of the crosshead (for example, mold clamping position) or the position of the movable platen.

The toggle mechanism 150 amplifies the driving force of the mold clamping motor 160 and transmits the force to the movable platen 120. That amplification factor is also called toggle magnification. The toggle magnification varies according to the angle θ (hereinafter also referred to as "link angle θ") formed by the first link 152 and the second link 153. The link angle θ is obtained from the position of the crosshead 151. The toggle magnification is maximum when the link angle θ is 180 degrees.

When the thickness of the mold device 800 changes due to the replacement of the mold device 800 or a change in the temperature of the mold device 800, the mold thickness is adjusted so that a prescribed clamping force is obtained when the mold is clamped. In mold thickness adjustment, the interval L between the fixed platen 110 and the toggle support 130 is adjusted so that the link angle θ of the toggle mechanism 150 becomes a predetermined angle at the time of mold touch, for example, when the movable mold 820 touches the fixed mold 810.

The mold clamping device 100 has a mold thickness adjustment mechanism 180. The mold thickness adjustment mechanism 180 adjusts the interval L between the fixed platen 110 and the toggle support 130 to adjust the mold thickness. The timing of the mold thickness adjustment is performed, for example, between the end of the molding cycle and the start of the next molding cycle. The mold thickness adjustment mechanism 180 has, for example, a screw shaft 181 formed at the rear end of the tie bar 140, a screw nut 182 held rotatably and non-movably in the forward and backward direction by the toggle support 130, and a mold thickness adjustment motor 183 for rotating the screw nut 182 screwed to the screw shaft 181.

The screw shaft 181 and the screw nut 182 are provided for each tie bar 140. The rotary driving force of the mold thickness adjustment motor 183 may be transmitted to the multiple screw nuts 182 via the rotary driving force transmission part 185. Multiple screw nuts 182 can be rotated synchronously. The multiple screw nuts 182 can be rotated individually by changing the transmission path of the rotary driving force transmission part 185.

The rotary driving force transmission part 185 is configured by, for example, gears. In this case, a driven gear is formed on the outer circumference of each screw nut 182, a driving gear is attached to the output shaft of the mold thickness adjustment motor 183, and a plurality of driven gears and an intermediate gear meshing with the driving gear are held rotatably at the center of the toggle support 130. The rotary driving force transmission part 185 may be configured by a belt, pulley or the like instead of a gear.

The operation of the mold thickness adjustment mechanism 180 is controlled by the controller 700. The controller 700 drives the mold thickness adjustment motor 183 to rotate the screw nut 182. As a result, the position of the toggle support 130 with respect to the tie bar 140 is adjusted and the interval L between the fixed platen 110 and the toggle support 130 is adjusted. A combination of multiple mold thickness adjustment mechanisms may be used.

The interval L is detected using the mold thickness adjustment motor encoder 184. The mold thickness adjustment motor encoder 184 detects the amount and direction of rotation of the mold thickness adjustment motor 183 and sends a signal indicating the result of the detection to the controller 700. The detection result of the mold thickness adjustment motor encoder 184 is used to monitor and control the position and interval L of the toggle support 130. The toggle support position detector for detecting the position of the toggle support 130 and the interval detector for detecting the interval L are not limited to the mold thickness adjustment motor encoder 184, and a general detector can be used.

The mold clamping device 100 may have a mold temperature controller to regulate the temperature of the mold device 800. The mold device 800 has a flow path of the temperature control medium inside. The mold temperature controller adjusts the temperature of the mold device 800 by adjusting the temperature of the temperature control medium supplied to the flow path of the mold device 800.

The mold clamping device 100 of the present embodiment is a horizontal type with the mold opening and closing direction in the horizontal direction, but it may be a vertical type with the mold opening and closing direction in the vertical direction.

The mold clamping device 100 in the present embodiment has the mold clamping motor 160 as a driving part. A hydraulic cylinder may be included instead of the mold clamping motor 160. The mold clamping device 100 may also have a linear motor for opening and closing the mold, and may include an electromagnet for clamping.

(Ejector Device)

In the description of the ejector device 200, as in the description of the mold clamping device 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector device 200 is attached to the movable platen 120 and moves back and forth with the movable platen 120. The ejector device 200 has an ejector rod 210 that ejects the molded product from the mold device 800 and a drive mechanism 220 that moves the ejector rod 210 in the moving direction (X-axis direction) of the movable platen 120.

The ejector rod 210 is disposed so as to move backward and forward in a through hole of the movable platen 120. The front end of the ejector rod 210 contacts an ejector plate 826 of the movable mold 820. The front end of the ejector rod 210 may or may not be connected to the ejector plate 826.

The drive mechanism 220 has, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector device 200 performs the ejection process under the control of the controller 700. In the ejection process, the ejector plate 826 is moved forward and the molded product is ejected by moving forward the ejector rod 210 from the standby position to the ejection position at a set moving velocity. The ejector motor is then driven to move backward the ejector rod 210 at a set moving velocity and the ejector plate 826 is moved backward to its original standby position.

The position and moving velocity of the ejector rod 210 are detected using, for example, an ejector motor encoder. The ejector motor encoder detects the rotation of the ejector motor and sends a signal indicating the result of the detection to the controller 700. The ejector rod position detector for detecting the position of the ejector rod 210 and the ejector rod moving velocity detector for detecting the moving velocity of the ejector rod 210 are not limited to ejector motor encoders, and a general detector can be used.

(Injection Device)

In the description of the injection device 300, unlike the description of the mold clamping device 100 and the description of the ejector device 200, the moving direction of the screw 330 during filling (for example, the negative X-axis direction) is described as forward and the moving direction of the screw 330 during measuring (for example, the positive X-axis direction) is described as backward.

The injection device 300 is disposed on a slide base 301, and the slide base 301 is disposed freely moving forward and backward with respect to the injection device frame 920. The injection device 300 is placed freely moving forward and backward with respect to the mold device 800. The injection device 300 touches the mold device 800 and fills the cavity space 801 in the mold device 800 with the molding material measured in the cylinder 310. The injection device 300 has, for example, a cylinder 310 that heats the molding material, a nozzle 320 provided at the front end of the cylinder 310, a screw 330 that is placed in the cylinder 310 freely moving forward and backward and freely rotating, a measuring motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin and the like. The molding material is formed, for example, in the form of a pellet and is supplied to the feed port 311 in a solid state. The feed port 311 is formed at the rear of the cylinder 310. A cooler 312, such as a water-cooled cylinder, is provided on the outer periphery at the rear of the cylinder 310. In front of the cooler 312, a heater 313 such as a band heater and a temperature detector 314 are provided on the outer periphery of the cylinder 310.

The cylinder 310 is divided into multiple zones in the axial direction (for example, X-axis direction) of the cylinder 310. Each of the multiple zones is provided with the heater 313 and the temperature detector 314. A set temperature is set in each of the multiple zones, and the controller 700 controls the heater 313 so that the temperature detected by the temperature detector 314 becomes the set temperature.

A nozzle 320 is provided at the front end of the cylinder 310 and pressed against the mold device 800. The heater 313 and the temperature detector 314 are provided on the outer periphery of the nozzle 320. The controller 700 controls the heater 313 so that the detection temperature of the nozzle 320 becomes the set temperature.

The screw 330 is disposed so as to be able to rotate and move in the forward and backward direction in the cylinder 310. As the screw 330 is rotated, the molding material is sent forward along the spiral groove of the screw 330. The molding material is gradually melted by heat from the cylinder 310 while being sent forward. As the liquid molding material is sent forward of the screw 330 and accumulated at the front of the cylinder 310, the screw 330 is moved backward. When the screw 330 is then moved forward, the liquid molding material accumulated in front of the screw 330 is injected from the nozzle 320 and filled into the mold device 800.

A backflow prevention ring 331 is attached to the front of the screw 330 in a retractable manner as a backflow prevention valve to prevent backflow of the molding material from the front to the rear of the screw 330 when the screw 330 is pushed forward.

As the screw 330 is moved forward, the backflow prevention ring 331 is pushed backward by the pressure of the molding material ahead of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and moved forward relatively to the screw 330 to an open position (see FIG. 1) that opens the flow path of the molding material. This sends the molding material forward of the screw 330.

The backflow prevention ring 331 may be either a co-rotating type that rotates with the screw 330 or a non-co-rotating type that does not rotate with the screw 330.

The injection device 300 may have a driving source that moves the backflow prevention ring 331 back and forth with respect to the screw 330 between the open position and the closed position.

The measuring motor 340 rotates the screw 330. The driving source for rotating the screw 330 is not limited to the measuring motor 340, but may be, for example, a hydraulic pump and the like.

The injection motor 350 moves the screw 330 back and forth. Between the injection motor 350 and the screw 330, a motion conversion mechanism is provided to convert the rotational motion of the injection motor 350 into the linear motion of the screw 330. The motion conversion mechanism has a screw shaft, for example, and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder and the like.

The load detector 360 detects the load transmitted between the injection motor 350 and the screw 330. The detected load is converted to pressure by the controller 700. The load detector 360 is provided in the transmission path of the load between the injection motor 350 and the screw 330 to detect the load acting on the load detector 360.

The load detector 360 sends a signal of the detected load to the controller 700. The load detected by the load detector 360 is converted into the pressure acting between the screw 330 and the molding material and is used to control and monitor the pressure the screw 330 receives from the molding material, the back pressure against the screw 330, and the pressure acting on the molding material from the screw 330.

The pressure detector for detecting the pressure of the molding material is not limited to the load detector 360, but a general detector can be used. For example, a nozzle pressure sensor or an in-mold pressure sensor may be used. The nozzle pressure sensor is installed in the nozzle 320. The in-mold pressure sensor is installed inside the mold device 800.

The injection device 300 performs a measuring process, filling process, pressure-holding process, and the like, under the control of the controller 700. The filling and pressure-holding processes may be collectively referred to as the injection process.

In the measuring process, the measuring motor 340 is driven to rotate the screw 330 at a set rotational velocity and feed the molding material forward along the spiral groove of the screw 330. According to this, the molding material is gradually melted. As the liquid molding material is sent forward of the screw 330 and accumulated at the front of the cylinder 310, the screw 330 is moved backward. The rotational velocity of the screw 330 is detected using, for example, the measuring motor encoder 341. The measuring motor encoder 341 detects the rotation of the measuring motor 340 and sends a signal indicating the detection result to the controller 700. The screw-rotation velocity detector for detecting the rotation velocity of the screw 330 is not limited to the measuring motor encoder 341, and a general detector can be used.

In the measuring process, a set back pressure may be applied to the screw 330 by driving the injection motor 350 to limit the sudden backward movement of the screw 330. The back pressure against the screw 330 is detected using, for example, the load detector 360. When the screw 330 moves backward to the measuring completion position and a predetermined amount of molding material accumulates in front of the screw 330, the measuring process is completed.

The position and rotational velocity of the screw 330 in the measuring process are set together as a series of setting conditions. For example, measuring start position, rotational velocity switching position, and measuring completion position are set. These positions are arranged in this order from front to back and represent the start and end points of the section where the rotational velocity is set. For each section, a rotational velocity is set. One or more rotational velocity switching positions may be used. The rotational velocity switching position need not be set. Also, back pressure is set for each section.

In the filling process, the injection motor 350 is driven to move forward the screw 330 at a set moving velocity, and the liquid molding material accumulated in front of the screw 330 is filled into the cavity space 801 in the mold device 800. The position and moving velocity of the screw 330 are detected using, for example, the injection motor encoder 351. The injection motor encoder 351 detects the rotation of the injection motor 350 and sends a signal indicating the result of the detection to the controller 700. When the position of the screw 330 reaches the set position, switching (so-called V/P switching) from the filling process to the pressure-holding process is performed. The position where the V/P switching is performed is also called the V/P switching position. The set moving velocity of the screw 330 may be changed according to the position, time, or the like of the screw 330.

The position and moving velocity of the screw 330 in the filling process are set together as a series of setting conditions. For example, a filling start position (also called the injection start position), a moving velocity switching position, and a V/P switching position are set. These positions are arranged in this order from the rear to the front and represent the start and end points of the section in which the moving velocity is set. For each section, a moving velocity is set. The moving velocity switching position may be one or more. The moving velocity switching position need not be set.

For each section where the moving velocity of the screw 330 is set, an upper limit of the pressure of the screw 330 is set. The pressure of the screw 330 is detected by the load detector 360. If the pressure of the screw 330 is less than or equal to the set pressure, the screw 330 is moved forward at the set moving velocity. On the other hand, if the pressure of the screw 330 exceeds the set pressure, the screw 330 is moved forward at a slower moving velocity than the set moving velocity so that the pressure of the screw 330 is less than or equal to the set pressure for the purpose of mold protection.

After the position of the screw 330 reaches the V/P switching position in the filling process, the screw 330 may be temporarily stopped at the V/P switching position, and then the V/P switching may be performed. Just before the V/P switch, a slow forward or slow backward movement of the screw 330 may be performed instead of stopping the screw 330. Moreover, the screw position detector for detecting the position of the screw 330 and the screw moving velocity detector for detecting the moving velocity of the screw 330 are not limited to the injection motor encoder 351, and a general detector can be used.

In the pressure-holding process, the injection motor 350 is driven to push the screw 330 forward, keeping the pressure of the molding material at the front end of the screw 330 (hereafter, it is also called "holding pressure") at a set pressure and pushing the remaining molding material in the cylinder 310 toward the mold device 800. The missing molding material due to cooling shrinkage in the mold device 800 can be replenished. The holding pressure is detected using, for example, the load detector 360. The set value of the holding pressure may be changed according to the elapsed time from the start of the pressure-holding process and the like. The holding pressure in the pressure-holding process and the holding time for holding the holding pressure may be set multiple times, respectively, and may be set together as a series of setting conditions.

In the pressure-holding process, the molding material in the cavity space 801 in the mold device 800 is gradually cooled, and upon completion of the pressure-holding process, the inlet of the cavity space 801 is blocked by the solidified molding material. This condition is called a gate seal and prevents backflow of the molding material from the cavity space 801. After the pressure-holding process, a cooling process is initiated. The cooling process involves solidifying the molding material in the cavity space 801. The measuring process may be performed during the cooling process for the purpose of shortening the molding cycle time.

The injection device 300 of the present embodiment is an in-line screw system, but a pre-plastic system or the like may be used. The pre-plastic injection equipment supplies the injection cylinder with the molding material melted in the plasticizing cylinder, and the injection cylinder injects the molding material into the mold device. Within the plasticizing cylinder, the screw is rotatably and non-movably positioned in the forward and backward direction or the screw is rotatably and movably positioned in the forward and backward direction. On the other hand, in the injection cylinder, a plunger is placed freely moving forward and backward.

In addition, the injection device 300 of the present embodiment may be a horizontal type in which the axial direction of the cylinder 310 is horizontal, or a vertical type in which the axial direction of the cylinder 310 is vertical. The mold clamping device combined with the vertical injection device 300 may be either vertical or horizontal. Similarly, the mold clamping device combined with the horizontal injection device 300 may be either horizontal or vertical.

(Moving Device)

In the description of the moving device 400, as in the description of the injection device 300, the moving direction of the screw 330 during filling (for example, the negative X-axis direction) is referred to as the front, and the moving direction of the screw 330 during measuring (for example, the positive X-axis direction) is referred to as the rear.

The moving device 400 moves the injection device 300 forward and backward with respect to the mold device 800. The moving device 400 also presses the nozzle 320 against the mold device 800 to produce a nozzle touch pressure. The moving device 400 includes a hydraulic pump 410, a motor 420 as a driving source, a hydraulic cylinder 430 as a hydraulic actuator and the like.

The hydraulic pump 410 has a first port 411 and a second port 412. The hydraulic pump 410 is a pump that can rotate in both directions, and by switching the rotation direction of the motor 420, hydraulic fluid (for example, oil) is taken in from one of the first port 411 and the second port 412 and discharged from the other to generate hydraulic pressure. The hydraulic pump 410 can also suck the hydraulic fluid from the tank and discharge the hydraulic fluid from either the first port 411 or the second port 412.

The motor 420 operates the hydraulic pump 410. The motor 420 drives the hydraulic pump 410 in a rotational direction and a rotational torque according to a control signal from the controller 700. The motor 420 may be an electric motor or an electric servomotor.

The hydraulic cylinder 430 has a cylinder body 431, a piston 432, and a piston rod 433. The cylinder body 431 is fixed to the injection device 300. The piston 432 divides the inside of the cylinder body 431 into a front chamber 435 as a first chamber and a rear chamber 436 as a second chamber. The piston rod 433 is fixed to the fixed platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection device 300 is pushed forward. The injection device 300 is moved forward and the nozzle 320 is pressed against the fixed mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through the second flow path 402. When the hydraulic fluid discharged from the second port 412 is supplied to the rear chamber 436 of the hydraulic cylinder 430 through the second flow path 402, the injection device 300 is pushed backward. The injection device 300 is moved backward and the nozzle 320 is separated from the fixed mold 810.

In the present embodiment, the moving device 400 includes a hydraulic cylinder 430, but the present invention is not limited to this. For example, instead of the hydraulic cylinder 430, an electric motor and a motion conversion mechanism that converts the rotational motion of the electric motor into the linear motion of the injection device 300 may be used.

(Controller)

The controller 700 is configured by, for example, a computer and has a Central Processing Unit (CPU) 701, a storage medium 702 such as a memory, an input interface 703, and an output interface 704 as illustrated in FIGS. 1 and 2. The controller 700 performs various controls by having the CPU 701 execute the program stored in the storage medium 702. In addition, the controller 700 receives a signal from the outside at the input interface 703 and transmits a signal to the outside at the output interface 704. In addition, the controller 700 may send and receive information to and from an information processing device (e.g., personal computer) connected via a network with a communication interface 705.

The controller 700 repeatedly manufactures the molded product by repeating the measuring process, mold closing process, pressure-boosting process, clamping process, filling process, pressure-holding process, cooling process, depressurization process, mold opening process, ejection process, and the like. The sequence of operations to obtain the molded product, for example, from the beginning of the measuring process to the beginning of the next measuring process, is also called a "shot" or "molding cycle". The time required for one shot is also called the "molding cycle time" or "cycle time."

One molding cycle has, for example, the measuring process, mold closing process, pressure-boosting process, mold clamping process, filling process, pressure-holding process, cooling process, depressurizing process, mold opening process, and ejection process, in this order. The order here is the order of the start of each process. The filling process, pressure-holding process, and cooling process are performed during the clamping process. The start of the clamping process may coincide with the start of the filling process. The completion of the depressurization process coincides with the start of the mold opening process.

For the purpose of shortening the molding cycle time, multiple processes may be performed simultaneously. For example, the measuring process may be performed during the cooling process of the previous molding cycle or during the clamping process. In this case, the mold closing process may be performed at the beginning of the molding cycle. The filling process may also be started during the mold closing process. The ejection process may also be started during the mold opening process. If an on-off valve is provided to open and close the flow path of the nozzle 320, the mold opening process may be started during the measuring process. This is because even if the mold opening process is started during the measuring process, the molding material does not leak from the nozzle 320 if the on-off valve closes the flow path of the nozzle 320.

It should be noted that a single molding cycle may have processes other than the measuring process, mold closing process, pressure-boosting process, mold clamping process, filling process, pressure-holding process, cooling process, depressurizing process, mold opening process, and ejection process.

For example, after the completion of the pressure-holding process and before the start of the measuring process, a pre-measuring suck back process may be performed in which the screw 330 is moved backward to a preset measuring start position. The pressure of the molding material accumulated ahead of the screw 330 before the start of the measuring process can be reduced and the sudden backward movement of the screw 330 at the start of the measuring process can be prevented.

After the completion of the measuring process and before the start of the filling process, a post-measuring suck back process may be performed in which the screw 330 is moved backward to a preset filling start position (also called the injection start position). The pressure of the molding material accumulated ahead of the screw 330 before the start of the filling process can be reduced and the leakage of the molding material from the nozzle 320 before the start of the filling process can be prevented.

The controller 700 is connected to an operating device 750 that accepts input manipulations by the user and a display device 760 that displays a screen. The operating device 750 and the display device 760 are configured by, for example, a touch panel 770 and may be integrated. The touch panel 770 as the display device 760 displays the screen under control by the controller 700. Information such as the settings of the injection molding machine 10 and the current status of the injection molding machine 10 may be displayed on the screen of the touch panel 770. Moreover, on the screen of the touch panel 770, for example, an operation part such as a button or an input field for accepting an input operation by the user may be displayed. The touch panel 770 as the operating device 750 detects an input operation on the screen by the user and outputs a signal corresponding to the input operation to the controller 700. Thus, for example, while confirming the information displayed on the screen, the user can operate the operation part provided on the screen to set the injection molding machine 10 (including input of setting values) and the like. When the user operates the operation part provided on the screen, the operation of the injection molding machine 10 corresponding to the operation part can be performed. The operation of the injection molding machine 10 may be, for example, the operation (including stopping) of the mold clamping device 100, the ejector device 200, the injection device 300, the moving device 400, and the like. In addition, the operation of the injection molding machine 10 may be such as switching the screen displayed on the touch panel 770 as the display device 760.

The operating device 750 and the display device 760 of the present embodiment are described as being integrated as the touch panel 770, but they may be provided independently. In addition, a plurality of operating devices 750 may be provided. The operating device 750 and the display device 760 are arranged on the operating side (negative Y-axis direction) of the mold clamping device 100 (more specifically, the fixed platen 110).

FIRST EMBODIMENT

Figure 3:
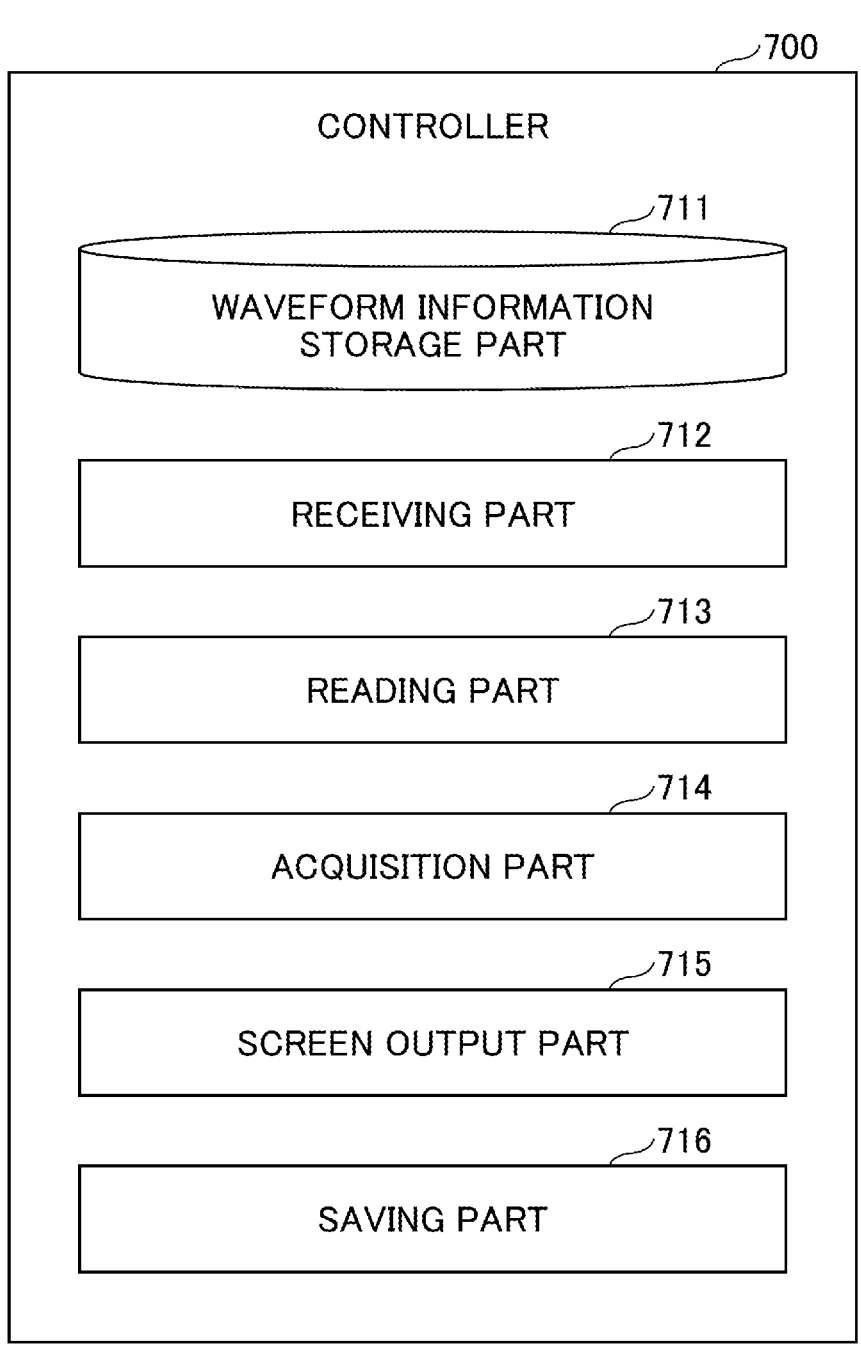
FIG. 3 is a functional block diagram illustrating components of a controller according to the first embodiment.

FIG. 3 is a functional block diagram illustrating the components of the controller 700 according to the first embodiment. The functional blocks illustrated in FIG. 3 are conceptual, and need not be physically constructed as illustrated. All or part of each functional block can be functionally or physically distributed and integrated in an arbitrary unit. All or an optional part of each processing function performed in each function block is realized by a program executed by the CPU 701. Alternatively, each functional block may be implemented as hardware by wire logic. As illustrated in FIG. 3, the controller 700 includes a receiving part 712, a reading part 713, an acquisition part 714, a screen output part 715, and a saving part 716. Further, the controller 700 includes a waveform information storage part 711 in the storage medium 702.

The waveform information storage part 711 stores files in which waveform data such as performance values detected by various sensors (detection devices) provided in the injection molding machine 10 are represented. The files stored by the waveform information storage part 711 is not limited to the performance values detected by the various sensors provided in the injection molding machine 10, which is a local device, but can also be actual performance values detected by the various sensors provided in other injection molding machines 10.

The receiving part 712 receives user operations from the touch panel 770 (operating device 750) via the input interface 703.

The saving part 716 stores files representing waveform data such as performance values detected by various sensors provided in the injection molding machine 10. In the present embodiment, when the receiving part 712 receives the operation to save the data from the touch panel 770 (operating device 750), the saving part 716 saves the waveform data representing the performance values and the like detected by the various sensors as files.

The reading part 713 reads the file stored in the waveform information storage part 711 according to the operation received from the operating device 750.

The acquisition part 714 acquires signals from sensors (an example of a detection device) that detect the operation of the injection molding machine 10. Sensors that acquire signals include, for example, the injection motor encoder 351 and the mold clamping motor encoder 161.

The screen output part 715 outputs the display screen and the like to the touch panel 770. The screen output part 715 outputs to the touch panel 770 a display screen (an example of a screen to be output) that includes setting information set by the user for that process or waveform data (an example of waveform information) that shows a change due to performance values detected in the process in wave form, for each process of the molding process by the injection molding machine 10. The display screen shown by the screen output part 715 in the present embodiment includes waveform data since the start of the process and the subsequent process. The screen output part 715 updates the relevant waveform data so that the results since the start of the process are represented in real time, based on the signals acquired by the acquisition part 714. The screen output part 715 updates the waveform data so that the results since the start of the process are represented in real time. Although the present embodiment describes an example of outputting display screens and the like to the touch panel 770, the destination of data output is not limited to the touch panel 770. For example, the screen output part 715 may output the display screen and the like to information processing devices connected via a network.

Figure 4:
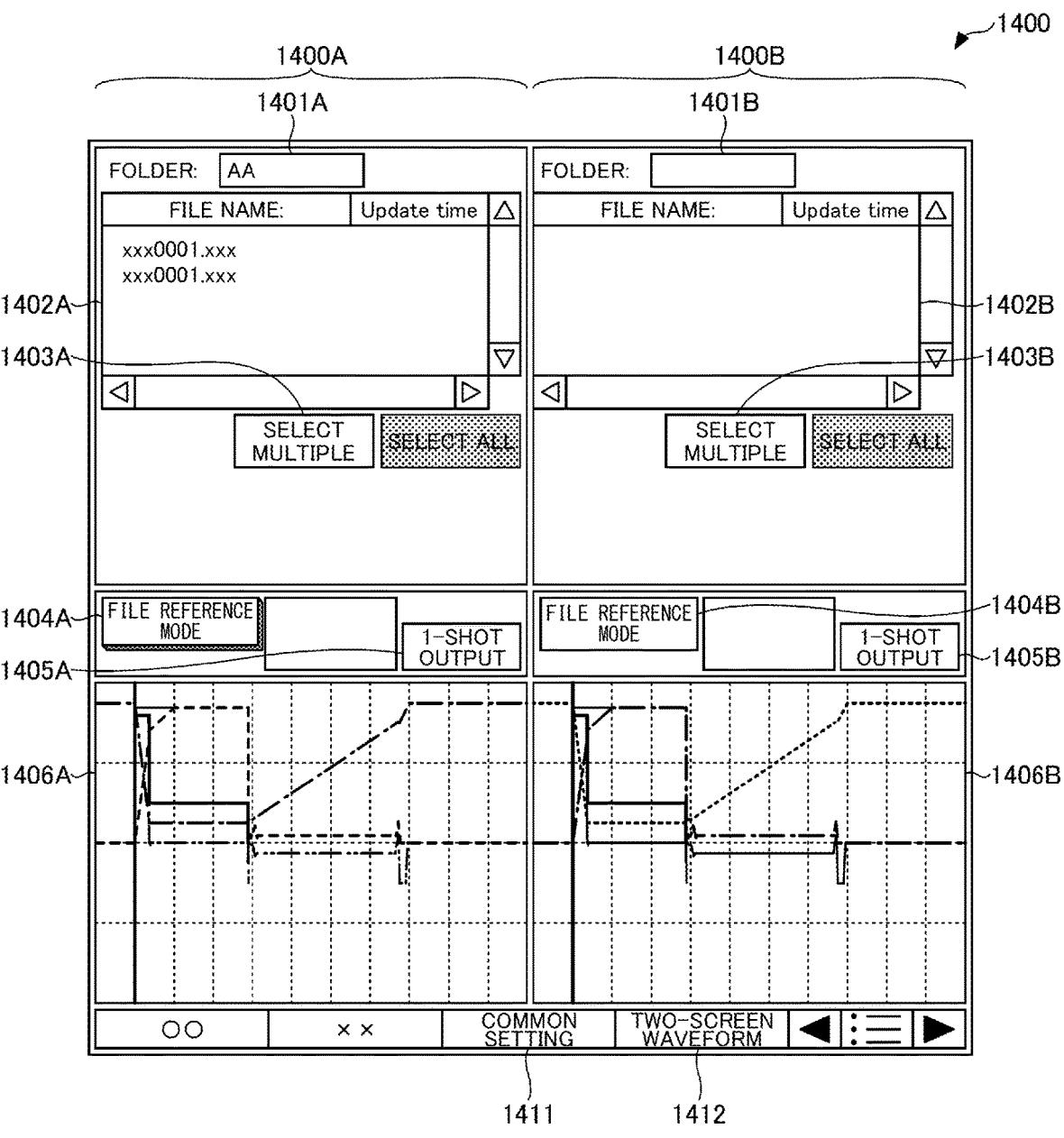
FIG. 4 is a diagram illustrating an example of a display screen output by the screen output part according to the first embodiment.

FIG. 4 is a diagram illustrating an example of a display screen output by the screen output part 715 according to the present embodiment. A display screen 1400 illustrated in FIG. 4 is a screen for selecting waveform data to be displayed. In the example illustrated in FIG. 4, a common setting 1411 and the two-screen waveform 1412 are illustrated as tabs for switching the display screen 1400.

When the receiving part 712 receives the action of pressing the tab of the common setting 1411, the screen output part 715 outputs the display screen 1400 illustrated in FIG. 4. The display screen that is output when the receiving part

712 receives the action of pressing the tab of the two-screen waveform 1412 is described below.

The display screen 1400 includes a first area setting field 1400A and a second area setting field 1400B for displaying waveform data of different types. The waveform data of different types could be, for example, differences in processes, or differences between historical waveform data read from a file and waveform data detected in real time.

The first area setting field 1400A includes a folder field 1401A, a file field 1402A, a multiple selectable button 1403A, a file reference mode setting button 1404A, a 1-shot output button 1405A, and a waveform data field 1406A.

The folder field 1401A is a field representing the folder (in the waveform information storage part 711) from which the file is to be read. The file field 1402A is a field for selecting a file to display waveform data. The file is the waveform data stored in the waveform information storage part 711, which represents the performance values and the like detected by the various sensors provided in the injection molding machine 10.

The multiple selectable button 1403A is a button for setting whether or not a plurality of files to be read are selected.

The file reference mode setting button 1404A is a button to be set whether or not the waveform data represented in the file is displayed in the first area. FIG. 4 is an example of the file reference mode setting button 1404A being pressed down.

When the file reference mode setting button 1404A is pressed down, the waveform data represented by the file selected from the file field 1402A is displayed. If the file reference mode setting button 1404A is not pressed down, the waveform data representing the performance values detected based on the trigger set by the user is displayed. The triggers are described below.

The 1-shot output button 1405A is a button for saving the waveform data displayed in the waveform data field 1406A to the folder shown in the folder field 1401A. When the 1-shot output button 1405A is pressed down, the saving part 716 saves the waveform data displayed in the waveform data field 1406A in a folder in the waveform information storage part 711.

The waveform data field 1406A is a field for displaying waveform data. When the file reference mode setting button 1404A is pressed down, the waveform data represented by the file selected in the file field 1402A is displayed. When the file reference mode setting button 1404A is not pressed down, the waveform data of the process set by the trigger (described later) set for the first area is displayed.

The second area setting field 1400B includes a folder field 1401B, a file field 1402B, a multiple selectable button 1403B, a file reference mode setting button 1404B, a 1-shot output button 1405B, and a waveform data field 1406B.

The folder field 1401B, the file field 1402B, the multiple selectable button 1403B, the file reference mode setting button 1404B, the 1-shot output button 1405B, and the waveform data field 1406B are the same as the folder field 1401A, the file field 1402A, the multiple selectable button 1403A, the file reference mode setting button 1404A, the 1-shot output button 1405A, and the waveform data field 1406A for the first display area except that buttons are provided to display waveform data in the second display area.

It should be noted that the file reference mode setting button 1404B illustrated in FIG. 4 is not pressed down.

Therefore, the waveform data field 1406B displays the waveform data of the process set by the trigger (described later) set for the second area.

Figure 5:
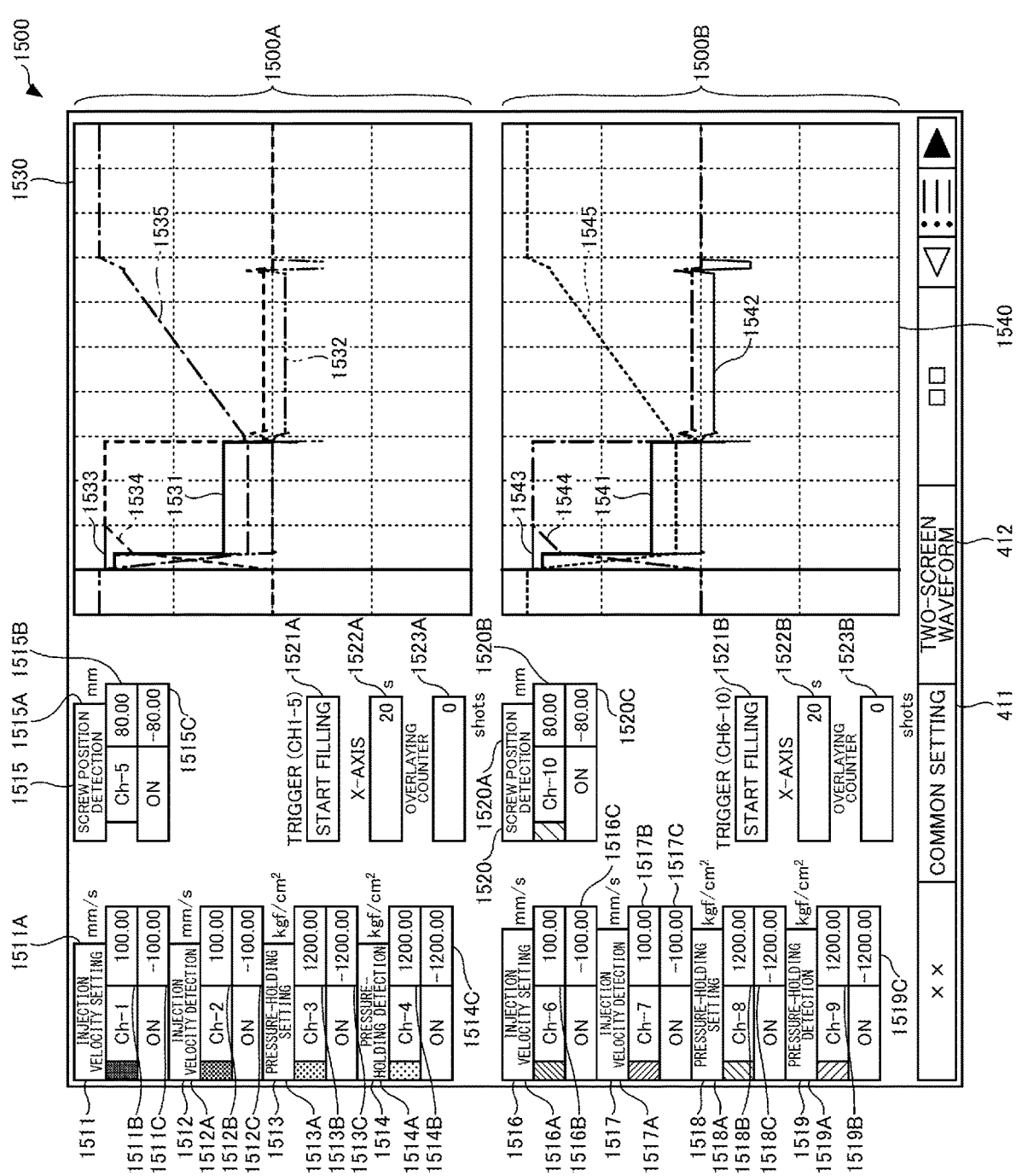
FIG. 5 is a diagram illustrating an example of the display screen output by the screen output part according to the first embodiment.

FIG. 5 is a diagram illustrating a display screen output by the screen output part 715 according to the present embodiment. An example of the screen illustrated in FIG. 5 is a display screen output when the "two-screen waveform" 1412 is pressed down.

The display screen 1500 illustrated in FIG. 5 is displayed based on the settings made in the screen illustrated in FIG. 4. The first area 1500A of the display screen illustrated in FIG. 5 is an example of an area displayed when the file reference mode setting button 1404A of the first area setting field 1400A of FIG. 4 is pressed down (setting to read the file so as to display the waveform data). FIG. 5 is an example of a read file in which performance values obtained from the filling process are stored. In the trigger (CH1-5) field 1521A (an example of a trigger for displaying waveform data), the step "start filling" is set. The "start filling" means the start of a filling process. Therefore, in the waveform data field 1530 of the first area 1500A, waveform data indicating performance values detected by various sensors after the start of the filling process in the past is displayed according to the read file.

The second area 1500B of the display screen illustrated in FIG. 5 is an example of an area displayed when the file reference mode setting button 1404B of the second area setting field 1400B of FIG. 4 is not pressed down (not setting to read the file so as to display the waveform data). "Start filling" is set in the trigger (CH6-10) field 1521B (an example of a trigger for displaying waveform data). Therefore, in the waveform data field 1540 of the second area 1500B, the processing results performed in a time range from the start of filling to the time set in the X-axis field 1522B are displayed in real time.

Various settings are made in the first area 1500A illustrated in FIG. 5 based on the read file. The following description is set based on the read file.

In the first area 1500A of the display screen 1500, a trigger (CH1-5) field 1521A, an X-axis field 1522A, and an overlaying counter field 1523A set based on the read file are illustrated. Further, in the first area 1500A, five channel fields (1st channel field 1511 to 5th channel field 1515) and a waveform data field 1530, which are set based on the read file, are illustrated.

The X-axis field 1522A is a field for setting a range of the X-axis (e.g., time) to be displayed in the waveform data field 1530. The overlaying counter field 1523A is a field representing the overlaid number (the overlaid shot number) of the waveform data displayed in the waveform data field 1530.

The trigger (CH1-5) field 1521A is a field representing a process of waveform data to be displayed in the waveform data field 1530 when a file is read.

In the trigger (CH1-5) field 1521A, "start filling" is set according to the read file. In the example illustrated in FIG. 5, the screen output part 715 displays waveform data, which is included in the read file, representing performance values detected by various sensors in the process. The items of the waveform data displayed in the waveform data field 1530 are set in five channel fields (the 1st channel field 1511 to the 5th channel field 1515).

The five channel fields (the 1st channel field 1511 to the 5th channel field 1515) are items set according to the loaded file, and items (types) of waveform data to be displayed are represented in these five fields. That is, in the present embodiment, five types of waveform data allocated to each channel can be displayed in the waveform data field 1530.

The 1st channel field 1511 is a field of items set in Ch-1. The item field 1511A represents the item, the maximum value field 1511B represents the maximum value (an example of scale information) of the waveform data of the item Ch-1, and the minimum value field 1511C represents the minimum value (an example of scale information) of the waveform data of the item Ch-1.

In each channel field, "ON" or "OFF" is displayed so as to be settable. When "ON" is selected, the waveform data of the relevant item is displayed, and when "OFF" is selected, the waveform data of the relevant item is not displayed.

"Injection velocity setting" is set in the item field 1511A, "100.00" is set in the maximum value field 1512B, and "−100.00" is set in the minimum value field 1512C. "Injection velocity setting" indicates the setting of the injection velocity of the screw 330 set by a user.

The 2nd channel field 1512 is a field of items set in Ch-2. The item field 1512A represents the item, the maximum value field 1512B represents the maximum value (an example of scale information) of the waveform data of the item Ch-2, and the minimum value field 1512C represents the minimum value (an example of scale information) of the waveform data of the item Ch-2.

"Injection velocity setting" is set in the item field 1512A, "100.00" is set in the maximum value field 1512B, and "−100.00" is set in the minimum value field 1512C. "Injection velocity setting" indicates an injection velocity of the screw 330 detected by the injection motor encoder 351.

The 3rd channel field 1513 is a field of items set in Ch-3. The item field 1513A represents the item, the maximum value field 1513B represents the maximum value (an example of scale information) of the waveform data of the item Ch-3, and the minimum value field 1513C represents the minimum value (an example of scale information) of the waveform data of the item Ch-3.

"Pressure-holding setting" is set in the item field 1513A, "1200.00" is set in the maximum value field 1513B, and "−1200.00" is set in the minimum value field 1513C. The "pressure-holding setting" indicates the value of the holding pressure set by a user.

The 4th channel field 1514 is a field of items set in Ch-4. The item field 1514A represents the item, the maximum value field 1514B represents the maximum value (an example of scale information) of the waveform data of the item Ch-4, and the minimum value field 1514C represents the minimum value (an example of scale information) of the waveform data of the item Ch-4.

"Pressure-holding detection" is set in the item field 1514A, "1200.00" is set in the maximum value field 1514B, and "−1200.00" is set in the minimum value field 1514C. The "pressure-holding detection" indicates the value of the holding pressure set by the load detector 360.

The 5th channel field 1515 is a field of items set in Ch-5. The item field 1515A represents the item, the maximum value field 1515B represents the maximum value (an example of scale information) of the waveform data of the item Ch-5, and the minimum value field 1515C represents the minimum value (an example of scale information) of the waveform data of the item Ch-5.

"Screw position detection" is set in the item field 1515A, "80.00" is set in the maximum value field 1515B, and "−80.00" is set in the minimum value field 1515C. The "screw position detection" indicates the position of the screw 330 detected by the injection motor encoder 351.

The waveform data field 1530 of FIG. 5 is a field for displaying waveform data (an example of first waveform information representing a change in a past performance value) of items set in each of the five channel fields (the 1st channel field 1511 to the 5th channel field 1515) in the process indicated by the trigger (CH1-5) field 1521A.

The waveform data 1531 in the waveform data field 1530 indicates a change of the setting information of the "injection velocity setting" set in the 1st channel field 1511 (Ch-1).

The maximum value of the waveform data field 1530 for displaying the waveform data 1531 is the value set in the maximum value field 1511B, and the minimum value of the waveform data field 1530 for displaying the waveform data 1531 is the value set in the minimum value field 1511C. The descriptions of the maximum value and the minimum value of the waveform data displayed in the waveform data field 1530 are the same as above. Therefore, the descriptions thereof are omitted.

The waveform data 1532 indicates a change in a detection result (an example of a performance value) of "injection velocity detection" set in the 2nd channel field 1512 (Ch-2). The waveform data 1533 indicates a change in "pressure-holding setting" set in the 3rd channel field 1513 (Ch-3).

The waveform data 1534 indicates a change in a detection result (an example of a performance value) of "pressure-holding detection" set in the 4th channel field 1514 (Ch-4). The waveform data 1535 indicates a change in the detection result of "screw position detection" set in the 5th channel field 1515 (Ch-5).

In the second area 1500B illustrated in FIG. 5, detection results detected by various sensors, which are acquired by the acquisition part 714 at the step "start filling" set in the trigger (CH6-10) field 1521B in the injection molding machine 10, are displayed in real time.

Next, the second area 1500B will be described. The trigger (CH6-10) field 1521B is a field for selecting a process to be displayed in the waveform data field 1540. The trigger (CH6-10) field 1521B according to the present embodiment is, for example, a menu type, and the user performs an operation of selecting a process to be displayed from the menu displayed in the trigger (CH6-10) field 1521B via the operating device 750.

In FIG. 5, "start filling" is set in the trigger (CH6-10) field 1521B. In the example illustrated in FIG. 5, when "start filling" is started in the injection molding machine 10, the screen output part 715 starts to display the waveform data of each item set in the five channel fields (the 6th channel field 1516 to the 10th channel field 1520) in the waveform data field 1540.

The X-axis field 1522B is a field for setting a range of the X-axis (e.g., time) to be displayed in the waveform data field 1540. The overlaying counter field 1523B is a field representing the overlaid number (the overlaid shot number) of the waveform data displayed in the waveform data field 1540.

In the present embodiment, the channel field (the 6th channel field 1516 to the 10th channel field 1520) includes not only performance values detected by various sensors but also setting information by a user. Therefore, the screen output part 715 also displays waveform data based on the setting information stored in the storage medium 702.

In the present embodiment, on the condition that the process set in the trigger (CH6-10) field 1521B is reached, the screen output part 715 starts drawing the waveform data of the process in the waveform data field 1540. Next, each item of the display screen will be described.

The five channel fields (the 6th channel field 1516 to the 10th channel field 1520) are fields for selecting items to be displayed as waveform data in the waveform data field 1540. That is, in the present embodiment, five waveform data relating to items allocated to each channel can be displayed in the waveform data field 1540.

The 6th channel field 1516 is a field for setting items in Ch-6. An item to be displayed is set in an item field 1516A, a maximum value (an example of scale information) to be displayed as waveform data of Ch-6 is set in a maximum value field 1516B, and a minimum value (an example of scale information) to be displayed as waveform data of Ch-6 is set in a minimum value field 1516C.

When the item field 1516A is pressed down via the operating device 750 (for example, touch panel 770), the screen output part 715 outputs a menu screen on which a plurality of items are displayed. The receiving part 712 receives a selection of items (various settings and detection results of each sensor) to be set in Ch-6 from the menu screen. The descriptions of the item fields 1517A to 1520A are similar to the above, therefore the descriptions thereof are omitted.

The maximum value field 1516B and the minimum value field 1516C are fields in which numerical values can be input. The receiving part 712 receives the input of the numerical value set in the maximum value field 1516B or the minimum value field 1516C via the operating device 750. The descriptions of the maximum value fields 1517B to 1520B and the minimum value fields 1517C to 1520C are similar to the above, therefore the descriptions thereof are omitted.

In each channel field, "ON" or "OFF" is displayed so as to be settable. When "ON" is selected, the waveform data of the relevant item is displayed, and when "OFF" is selected, the waveform data of the relevant item is not displayed.

FIG. 5 illustrates an example such that "injection velocity setting" is set in the item field 1516A, "100.00" is set in the maximum value field 1516B, and "−100.00" is set in the minimum value field 1516C.

The 7th channel field 1517 is a field of items set in Ch-7. The item field 1517A represents the item, the maximum value field 1517B represents the maximum value (an example of scale information) of the waveform data of the item Ch-7, and the minimum value field 1517C represents the minimum value (an example of scale information) of the waveform data of the item Ch-7.

FIG. 5 illustrates an example such that "injection velocity detection" is set in the item field 1517A, "100.00" is set in the maximum value field 1517B, and "−100.00" is set in the minimum value field 1517C.

The 8th channel field 1518 is a field of items set in Ch-8. The item field 1518A represents the item, the maximum value field 1518B represents the maximum value (an example of scale information) of the waveform data of the item Ch-8, and the minimum value field 1518C represents the minimum value (an example of scale information) of the waveform data of the item Ch-8.

FIG. 5 illustrates an example such that "pressure-holding setting" is set in the item field 1518A, "1200.00" is set in the maximum value field 1518B, and "−1200.00" is set in the minimum value field 1518C.

The 9th channel field 1519 is a field of items set in Ch-9. The item field 1519A represents the item, the maximum value field 1519B represents the maximum value (an example of scale information) of the waveform data of the item Ch-9, and the minimum value field 1519C represents the minimum value (an example of scale information) of the waveform data of the item Ch-9.

FIG. 5 illustrates an example such that "pressure-holding detection" is set in the item field 1519A, "1200.00" is set in the maximum value field 1519B, and "−1200.00" is set in the minimum value field 1519C.

The 10th channel field 1520 is a field of items set in Ch-10. The item field 1520A represents the item, the maximum value field 1520B represents the maximum value (an example of scale information) of the waveform data of the item Ch-10, and the minimum value field 1520C represents the minimum value (an example of scale information) of the waveform data of the item Ch-10.

FIG. 5 illustrates an example such that "screw position detection" is set in the item field 1520A, "80.00" is set in the maximum value field 1520B, and "−80.00" is set in the minimum value field 1520C.

The waveform data field 1540 of FIG. 5 is a field for displaying waveform data (an example of second waveform information representing a change in performance values indicated by signals acquired by the acquisition part 714) of each item set in each of the five channel fields (the 6th channel field 1516 to the 10th channel field 1520) in the process indicated by the trigger (CH6-10) field 1521B.

The waveform data 1541 in the waveform data field 1540 indicates a change in the setting information of the "injection velocity setting" set in the 6th channel field 1516 (Ch-6).

The maximum value of the waveform data field 1540 for displaying the waveform data 1541 is the value set in the maximum value field 1516B, and the minimum value of the waveform data field 1540 for displaying the waveform data 1541 is the value set in the minimum value field 1516C. The description of the maximum value and the minimum value of the waveform data displayed in the waveform data field 1540 are similar to the above. Therefore, the descriptions thereof are omitted.

The waveform data 1542 indicates a change in detection result (an example of a performance value) of the "injection velocity detection" set in the 7th channel field 1517 (Ch-7). The waveform data 1543 indicates a change in setting information of "pressure-holding setting" set in the 8th channel field 1518 (Ch-8).

The waveform data 1544 indicates a change in a detection result (an example of a performance value) of the "pressure-holding detection" set in the 9th channel field 1519 (Ch-9). The waveform data 1545 indicates a change in the detection result (an example of the performance value) of the "screw position detection" set in the 10th channel field 1520 (Ch-10).

The receiving part 712 according to the present embodiment receives selection of items for the item fields 1516A to 1520A. When the process set in the trigger (CH6-10) field 1521B is reached after the receiving part 712 receives the selection of the item, the screen output part 715 starts to display the waveform data of each item set in the five channel fields (the 6th channel field 1516 to the 10th channel field 1520) in the waveform data field 1540.

In the display screen 1500 illustrated in FIG. 5, the waveform data field 1530 of the first area 1500A displays waveform data of past processing results performed in a time range from the start of the past filling process to the lapse of a set time, and the waveform data field 1540 of the second area 1500B displays waveform data of processing results from the start of the filling process in real time. The five channel fields (the 1st channel field 1511 to the 5th channel field 1515) of the waveform data field 1530 of the first area 1500A are associated with the five channel fields (the 6th channel field 1516 to the 10th channel field 1520) of the waveform data field 1530 of the second area 1500B. Therefore, the user can check the correspondence relation between the processing result of the past filling process and the processing result of the current filling process for each item. When the real-time processing result is different from the past performance value, the user can immediately grasp the difference between the waveform data. As described above, in the controller 700 of the present embodiment, it is easy to make the user recognize the current situation by performing the two-screen display of the processing result of the past process and the real-time situation of the current process.

In the example illustrated in FIG. 5, an example in which the items of the five channel fields are matched between the past process and the current process has been described, but the method is not limited to matching all the channel fields, and the items of the channel fields set between the past process and the current process may be different. There is no particular limitation to the manner in which items in channels are different, and all the items in the channel fields may be different, or any number of items may be different.

The display device 760 displays a display screen or the like illustrated in FIG. 5 on a display panel (not shown) (an example of a display part) in accordance with an instruction from the controller 700. That is, the display device 760 displays a display screen containing the waveform data representing the change in the past performance value shown in the file read from the waveform information storage part 711 and the waveform data representing the change in the performance value shown in the signals acquired by the acquisition part 714.

Figure 6:
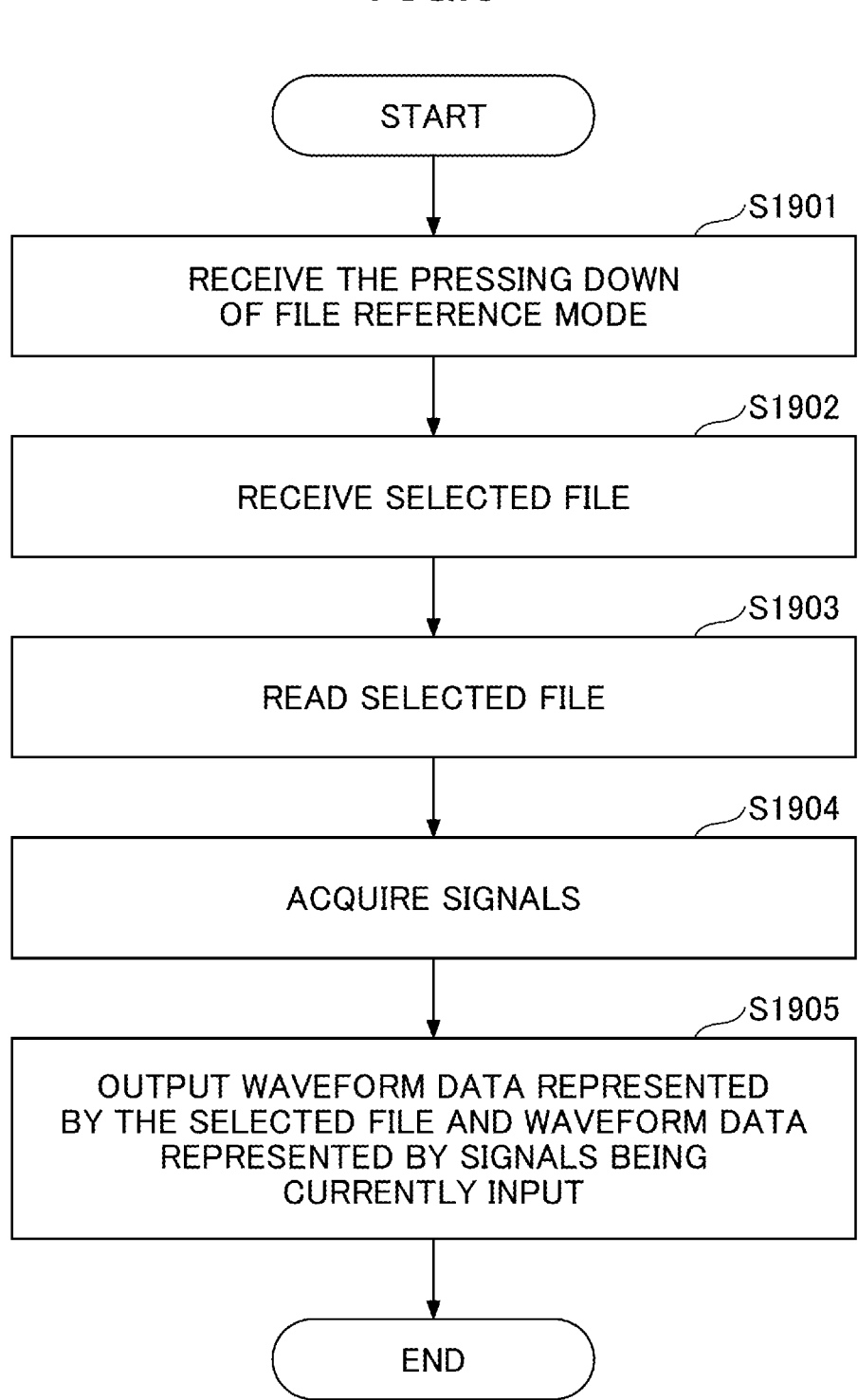
FIG. 6 is a flowchart illustrating a control procedure performed when outputting the display screen generated based on a selected file in the first embodiment of the controller.

Next, the control procedure performed when outputting the display screen generated based on the selected file in the controller 700 according to the first embodiment will be described. FIG. 6 is a flowchart showing the control procedure performed when the display screen generated based on the selected file is output in the controller 700 according to the first embodiment.

In the flowchart illustrated in FIG. 6, the display screen shown in FIG. 4 has already been output to the display device 760. In the display screen, it is assumed that the file reference mode setting button 1404A in the first area and the file reference mode setting button 1404B in the second area are not pressed down.

Then, the receiving part 712 receives the pressing of the file reference mode setting button 1404A in the first area (S1901). This switches the first area where the file reference mode was pressed down to the file reference mode.

The receiving part 712 receives file selection from the file field 1402A in the area where the file reference mode setting button 1404A is pressed down (S1902). The receiving part 712 receives an operation for the folder field 1401A, and the screen output part 715 outputs a display screen in which the folder of the file that is read is changed.

Note that the file reference mode setting button 1404B in the second area is not pressed down. Therefore, the acquisition part 714 acquires signals indicating the detection results by various sensors in the currently set process based on the setting of the second area 1500B of the display screen in FIG. 5 (S1903).

The screen output part 715 outputs a display screen including waveform data showing the result read from the selected file and waveform data represented by the signal acquired by the acquisition part 714 to the display device

760. The display screen may be the display screen illustrated in FIG. 4 or the display screen illustrated in FIG. 5.

In the display screen illustrated in FIG. 4, the waveform data read from the file is represented in the waveform data field 1406A, and the waveform data from the signal acquired by the acquisition part 714 is represented in the waveform data field 1406B.

In the display screen illustrated in FIG. 5, the waveform data read from the file is represented in the waveform data field 1530, and the waveform data by the signal acquired by the acquisition part 714 is represented in the waveform data field 1540.

According to the processing procedure described above, the waveform data showing the result read from the file and the waveform data showing the detection result currently being performed by the injection molding machine 10 can be displayed on the display screen. This allows the user to compare the waveform data showing the current status of the injection molding machine 10 with the waveform data showing the previously detected status, thus making it easier to grasp the current status.

SECOND EMBODIMENT

In the above embodiment, an example of displaying the waveform data showing the results read from the file and the waveform data showing the detection results currently being performed by the injection molding machine 10 in a separate area was described. However, the method is not limited to displaying in a separate area, and display with superposition may be performed on one waveform data field. Therefore, in the second embodiment, the case where the waveform data showing the result read from the file and the waveform data showing the detection result currently being performed by the injection molding machine 10 are displayed in one area will be described. A configuration of the second embodiment is same as the first embodiment. Therefore, the description of the second embodiment is omitted.

Figure 7:
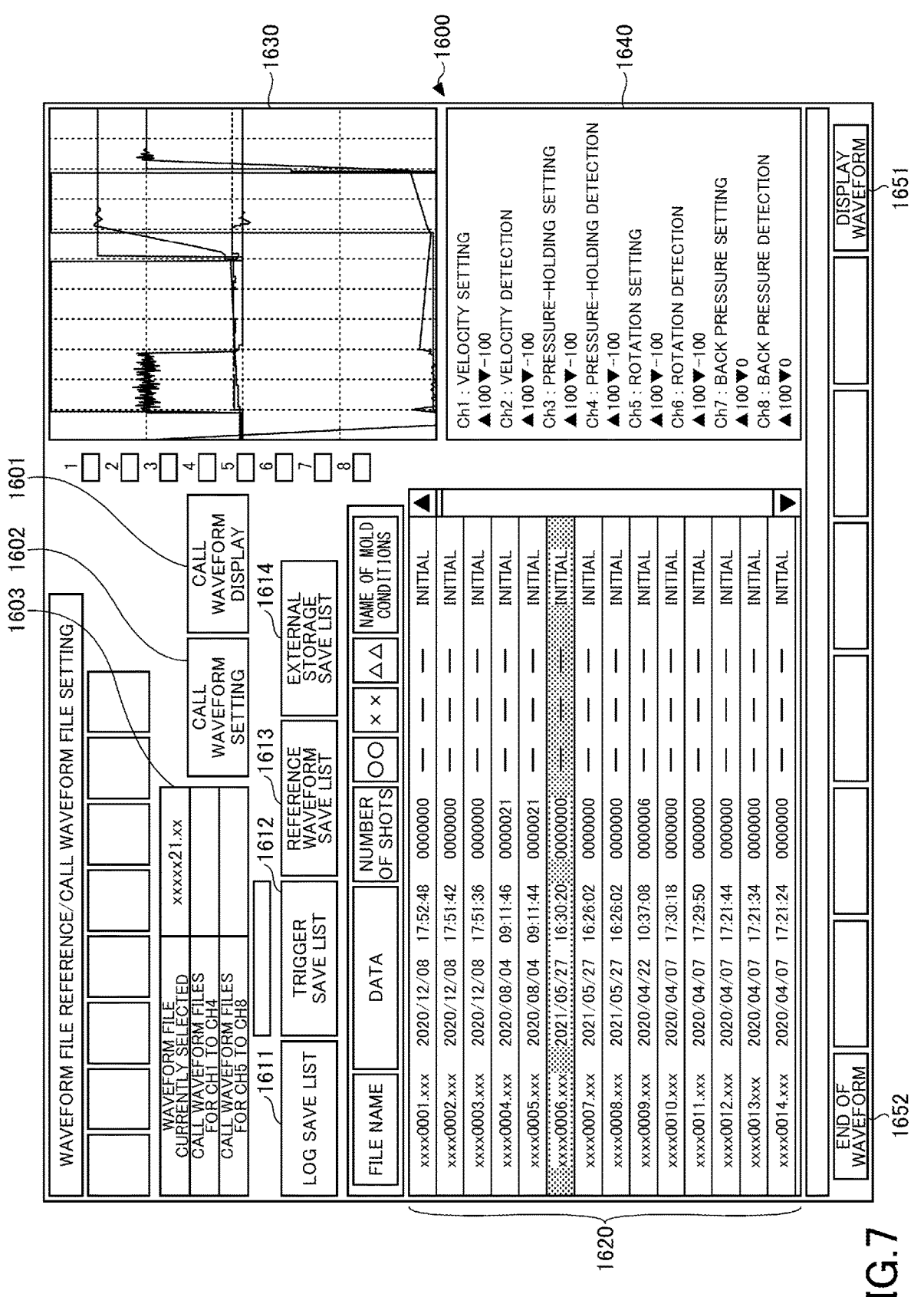
FIG. 7 is a diagram illustrating an example of a display screen output by the screen output part according to the second embodiment.

FIG. 7 is a diagram illustrating an example of a display screen output by the screen output part 715 according to the present embodiment. The display screen 1600 illustrated in FIG. 7 is a screen for selecting the waveform data to be displayed. In the example illustrated in FIG. 7, the waveform display 1651 and the waveform end 1652 are shown as tabs for switching the display screen 1600.

The display screen 1600 is a screen for setting a file to read the waveform data. A log saving list button 1611, a trigger saving list button 1612, a reference waveform saving list button 1613, and an external storage saving list button 1614 are buttons for switching the reading destination of the file.

The log saving list button 1611 is a button for displaying a list of files saved as logs. The trigger saving list button 1612 is used to display a list of files saved by an operation of a user. The reference waveform saving list button 1613 is used to display a file list showing the waveform data set as the reference for each process. The external storage saving list button 1614 is a button for displaying a file list stored in an external device.

When the receiving part 712 receives the pressing of the log saving list button 1611, the trigger saving list button 1612, the reference waveform saving list button 1613, or the external storage saving list button 1614, the screen output part 715 displays a list of files accepted for pressing down in a file field 1620.

The receiving part 712 receives selection of a file from a file list displayed in the file field 1620 via the operating device 750. The screen output part 715 displays the file received for selection in the selected waveform file field 1603.

Waveform data represented by the file set in the selected waveform file field 1603 is displayed in the waveform data field 1630. Settings represented by the file set in the selected waveform file field 1603 are displayed in the setting field 1640.

Furthermore, by receiving the pressing down of the waveform display call button 1601, the receiving part 712 can set the file to be read for display on the display screen of FIG. 8, which will be described later. Any method may be used for setting the file, regardless of the well-known method. For example, the receiving part 712 may set the file indicated in the selected waveform file field 1603 as the file to be read.

Furthermore, by receiving the pressing down of the waveform setting call button 1602, the receiving part 712 can set setting information of waveform data to be displayed. The setting information may include any setting, for example, items assigned to each channel.

When the receiving part 712 receives the pressing down of the waveform display 1651, the screen output part 715 outputs the display screen 1800 illustrated in FIG. 8, which will be described later. In addition, when the receiving part 712 receives the pressing down of the waveform end 1652, the display of the screen related to the waveform data ends.

Figure 8:
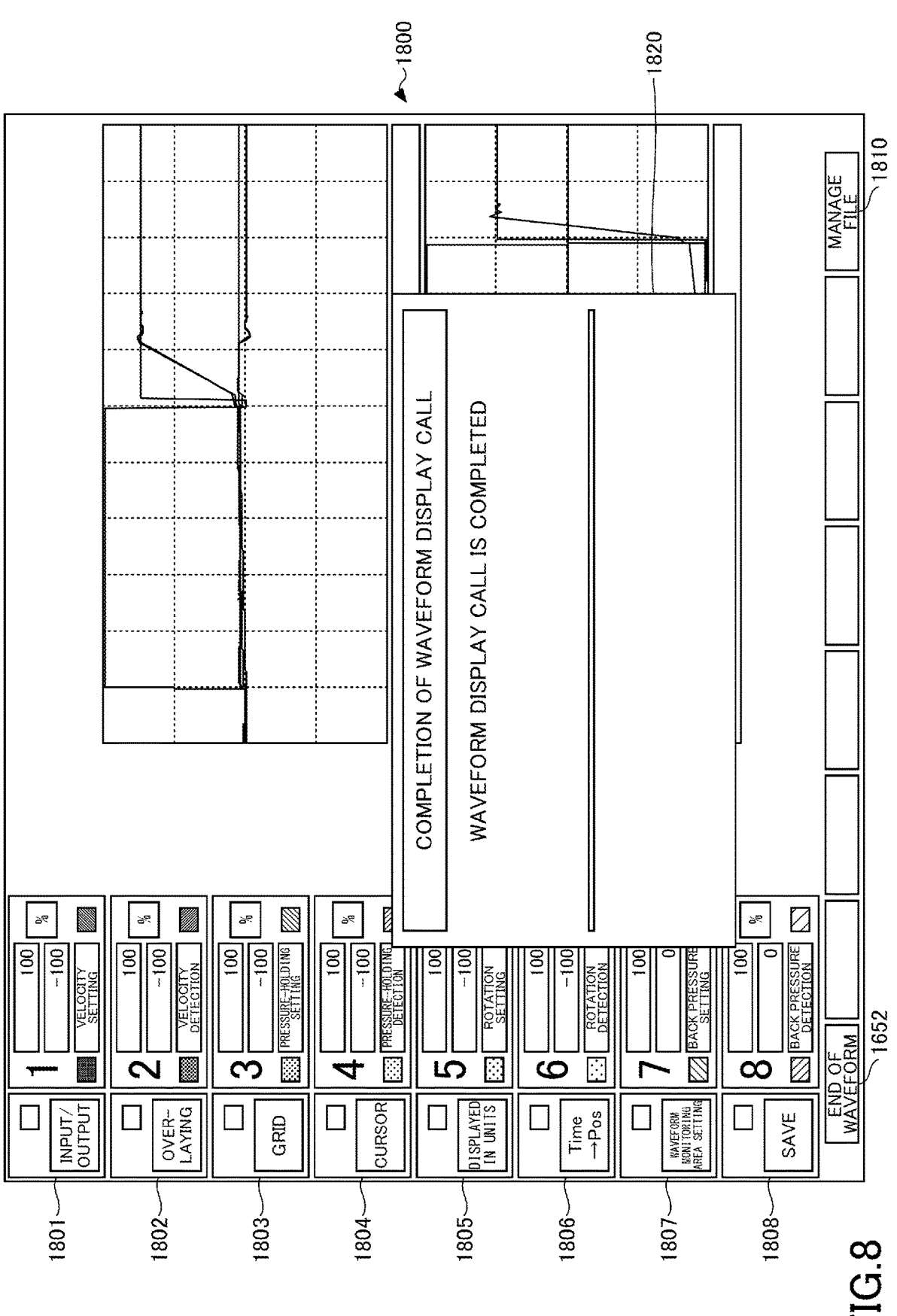
FIG. 8 is a diagram illustrating an example of the display screen output by the screen output part according to the second embodiment.

FIG. 8 illustrates an example of a display screen output by the screen output part 715 according to the present embodiment. The display screen 1800 illustrated in FIG. 8 is a screen for displaying waveform data. In the example illustrated in FIG. 8, the screen output part 715 outputs a display screen 1800 in which a pop-up window 1820 indicating completion of the waveform display call is represented. In the display screen illustrated in FIG. 8, the same configuration as in FIG. 7 will not be explained.

The pop-up window 1820 indicating the completion of the waveform display call is a pop-up displayed when the file call set by pressing down the waveform display call button 1601 in FIG. 7 is completed. In the present embodiment, after the reading part 713 reads the selected file, the screen output part 715 outputs a display screen in which the pop-up window 1820 is represented.

Furthermore, on the display screen 1800, an on/off button 1801, an overlaying button 1802, a grid button 1803, a cursor button 1804, a unit display button 1805, a Time→Pos. button 1806, a waveform monitoring area setting button 1807, and a save button 1808 are displayed.

The on/off button 1801 is a button to switch whether or not to display the waveform data.

The overlaying button 1802 is a button to switch between enabling or disabling of overlaying of the waveform data. When overlaying of waveform data is enabled, the waveform data detected in real time is overlaid.

The grid button 1803 is a button to switch whether or not a grid is displayed in the waveform data fields 1850 and 1860.

The cursor button 1804 is a button to switch whether or not a cursor is displayed. The unit display button 1805 is a button to switch whether or not units are displayed on the axes of the waveform data fields 1850 and 1860. The Time→Pos. button 1806 is a button to switch the horizontal axis from time to the position of the screw 330.

The waveform monitoring area setting button 1807 is a button for setting a monitoring area for the waveform data displayed in the waveform data fields 1850 and 1860. When a monitoring area is set, a determination is made as to whether or not the waveform data set preliminarily in the monitoring area exceeds a predetermined threshold.

The save button 1808 is for saving the waveform data displayed in the waveform data fields 1850 and 1860. When the file is saved by the button, the file can be selected as a file on the display screen illustrated in FIG. 7.

When the receiving part 712 receives the pressing down of the file manager 1810, the screen output part 715 outputs the display screen 1600 illustrated in FIG. 7. Next, the screen after the pop-up window 1820 disappears will be described.

Figure 9:
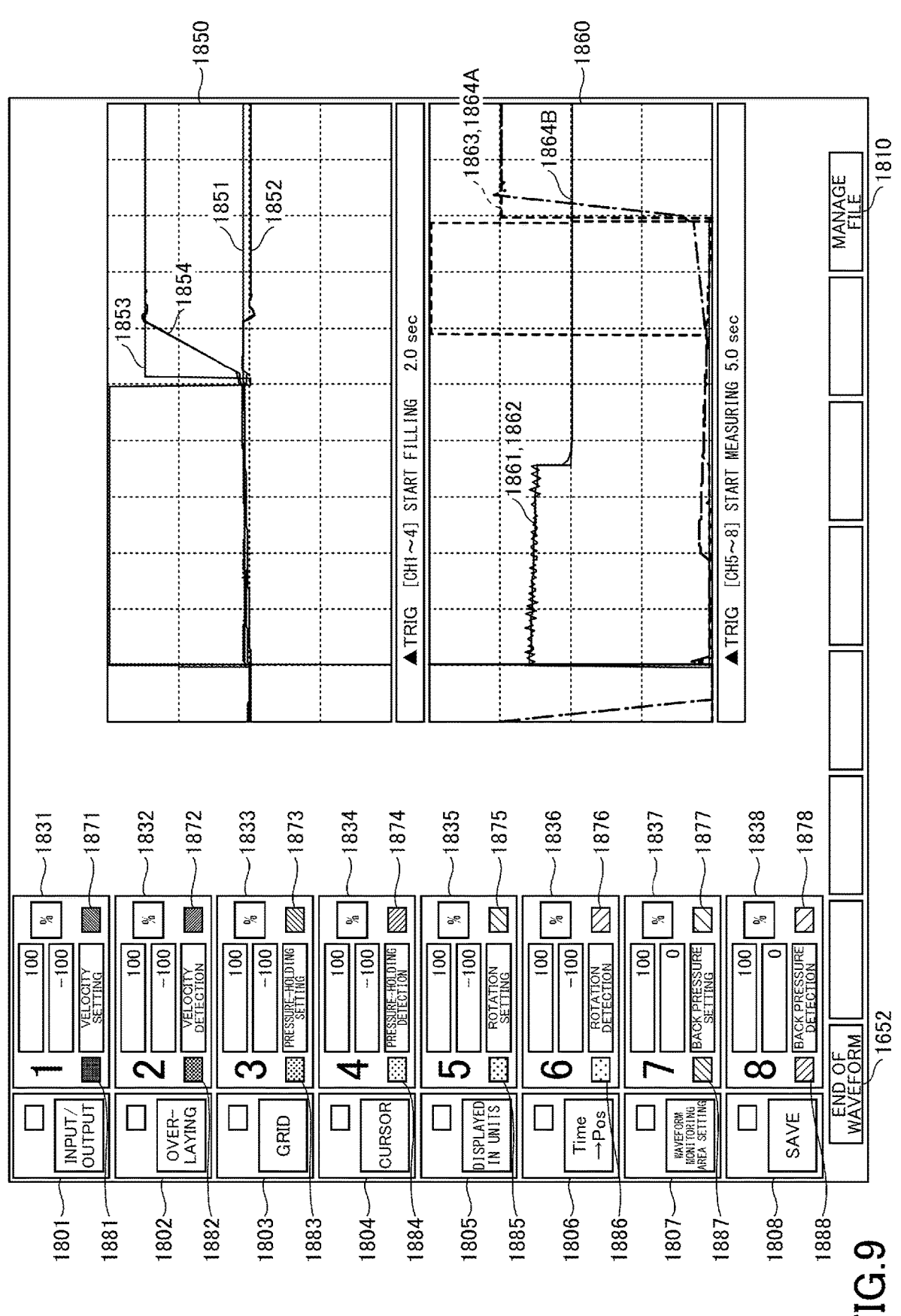
FIG. 9 is a diagram illustrating an example of the display screen output by the screen output part according to the second embodiment.

FIG. 9 illustrates an example of a display screen output by the screen output part 715 according to the present embodiment. The display screen illustrated in FIG. 9 is a screen for displaying waveform data. In the display screen illustrated in FIG. 9, the waveform data read from the file is fixed and displayed, and then the waveform data showing the performance value in real time is superimposed to the waveform data read from the file and displayed. It should be noted that the present embodiment is not limited to such a display mode, as long as the waveform data acquired in real time and the waveform data based on the file are displayed in one waveform data field. In the display screen illustrated in FIG. 9, the same configuration as in FIG. 8 will not be explained.

In the example illustrated in FIG. 9, eight channel fields (1st channel field 1831 to 8th channel field 1838) are provided. Colors assigned to the waveform data based on signals acquired by the acquisition part 714 and colors assigned to the waveform data based on the file read from the reading part 713 are shown in each of the channel fields (1st channel field 1831 to 8th channel field 1838).

In the example of the screen illustrated in FIG. 9, when the overlaying button 1802 is not in use, the waveform data read from the file is fixed and displayed, and then the waveform data showing the performance value in real time can be superimposed to the waveform data read from the file and displayed.

Waveform data in the 1st channel field 1831 to the 4th channel field 1834 are represented in the waveform data field 1850. Waveform data in the 5th channel field 1835 to the 8th channel field 1838 are represented in the waveform data field 1860. Next, each item represented in the waveform data field 1850 will be described.

The items "velocity setting", the maximum value "100", and the minimum value "−100" are set in the 1st channel field 1831. The explanation of items such as maximum value and minimum value are omitted because the explanation is the same as the first embodiment. The item such as "velocity setting" is the velocity of the screw 330 set by a user.

Furthermore, a color field 1881 representing the waveform data based on the settings made by the user and a color field 1871 representing the waveform data based on the file are indicated in the 1st channel field 1831.

Lines 1851 represented in the waveform data field 1850 are lines in which the waveform data (the color shown in color field 1881) based on the setting by the user is superimposed on the displayed waveform data (the color shown in the color field 1871) read from the file in the 1st channel field 1831.

The items "velocity detection", the maximum value "100", and the minimum value "−100" are set in the 2nd channel field 1832. In the 2nd channel field 1832, a color field 1882 representing the waveform data based on the signals (acquired by the acquisition part 714) acquired in real time and a color field 1872 representing the waveform data based on the file are indicated. The item such as "velocity detection" is the moving velocity of the screw 330 detected by the injection motor encoder 351.

Lines 1852 represented in the waveform data field 1850 are lines in which the waveform data (the color shown in the color field 1882) based on the signals acquired in real time (acquired by the acquisition part 714) is superimposed on the displayed waveform data (the color shown in the color field 1872) read from the file in the 2nd channel field 1831.

The items "pressure-holding setting", the maximum value "100", and the minimum value "−100" are set in the 3rd channel field 1833. In the 3rd channel field 1833, a color field 1883 representing the waveform data set by the user and a color field 1873 representing the waveform data based on the file are indicated. The item such as "pressure-holding setting" is a hold pressure set by the user.

Lines 1853 represented in the waveform data field 1850 are lines in which the waveform data (the color shown in the color field 1883) based on the setting by the user is superimposed on the displayed waveform data (the color shown in the color field 1873) read from the file in the 3rd channel field 1833.

The items "pressure-holding detection", the maximum value "100", and the minimum value "−100" are set in the 4th channel field 1834. In the 4th channel field 1834, a color field 1884 representing the waveform data based on the signals acquired in real time (acquired by the acquisition part 714) and a color field 1874 representing the waveform data based on the file are indicated. The item such as "pressure-holding detection" is a hold pressure detected by the load detector 360.

Lines 1854 represented in the waveform data field 1850 are lines in which the waveform data (the color shown in the color field 1884) obtained in real time is superimposed on the displayed waveform data (the color shown in the color field 1874) read from the file in the 4th channel field 1834.

Next, each item represented in the waveform data field 1860 will be described.

The items "rotation setting", the maximum value "100", and the minimum value "−100" are set in the 5th channel field 1835. In the 5th channel field 1835, a color field 1885 representing the waveform data based on the setting made by the user and a color field 1875 representing the waveform data based on the file are indicated. The item such as "rotation setting" is a rotational velocity of the screw 330 set by the user.

Lines 1861 represented in the waveform data field 1860 are lines in which the waveform data (the color shown in the color field 1885) based on the setting by the user is superimposed on the displayed waveform data (the color shown in the color field 1875) read from the file in the 5th channel field 1835. The items "rotation detection", the maximum value "100", and the minimum value "−100" are set in the 6th channel field 1836. In the 6th channel field 1836, a color field 1886 representing the waveform data based on the signals acquired (acquired by the acquisition part 714) and a color field 1876 representing the waveform data based on the file are indicated. The item such as "rotation detection" is a rotational velocity of the screw 330 detected by the measuring motor encoder 341.

Lines 1862 represented in the waveform data field 1860 are lines in which the waveform data (the color shown in the color field 1886) based on the signals acquired in real time (acquired by the acquisition part 714) is superimposed on the displayed waveform data (the color shown in the color field 1876) read from the file in the 6th channel field 1836. The line 1862 of the "rotation detection" substantially coincides with the line 1861 of the "rotation setting".

The items "back pressure setting", the maximum value "100", and the minimum value "0" are set in the 7th channel field 1837. In the 7th channel field 1837, a color field 1887 representing the waveform data set by the user and a color field 1877 representing the waveform data based on the file are indicated. The item such as "back pressure setting" is a back pressure setting with respect to the screw 330 by the user.

Lines 1863 represented in the waveform data field 1860 are lines in which the waveform data (the color shown in the color field 1887) based on the setting by the user is superimposed on the displayed waveform data (the color shown in the color field 1877) read from the file in the 7th channel field 1837.

The items "back pressure detection", the maximum value "100", and the minimum value "0" are set in the 8th channel field 1838. In the 8th channel field 1838, a color field 1888 representing the waveform data based on signals acquired (acquired by the acquisition part 714) in real time and a color field 1878 representing the waveform data based on the file are indicated. The item such as "back pressure detection" is a back pressure detected by the load detector 360.

A line 1864A represented in the waveform data field 1860 is a line indicated indicating the waveform data read from the file (the color indicated in the color field 1878) in the 8th channel field 1838. Moreover, in the 8th channel field 1838, a line 1864B is a line indicating the waveform data acquired in real time (the color indicated in the color filed 1888). Thus, in "back pressure detection", it can be confirmed that there is a discrepancy between the waveform data read from the file and the waveform data acquired in real time. As illustrated in FIG. 9, in the present embodiment, the waveform data read from the file is fixed, and then the real-time acquired waveform data is superimposed and displayed, making it easy for the user to grasp the discrepancy between the waveform data.

In the present embodiment, a display screen is output in each of the waveform data fields 1850 and 1860, which collectively show the real-time detected waveform data or the waveform data set by the user and the waveform data read from the file. This makes it easy for the user to see the difference between the past waveform data and the current waveform data. Therefore, even if an abnormality occurs in the current process, it becomes easy to recognize the abnormality.

According to the above embodiment, a processing performed in the process can be appropriately grasped, by determining whether the process has been properly realized based on the conditions set in the process. This enables proper quality control.

Furthermore, for each waveform data field, the display of the waveform data of the process is started when the conditions of the process set in the waveform data field are satisfied. This enables the user to grasp the status of the current process in the current injection molding machine 10 in real time.

According to the above embodiment, when the reading part 713 reads the file, the waveform data, which is arbitrarily selected by the user and shows the performance value of the past sensor, can be displayed. The reading part 713 can read any file from the file list displayed by pressing down any of the log saving list button 1611, trigger saving list button 1612, reference waveform saving list button 1613, and external storage saving list button 1614. That is, the reading part 713 is not restricted to reading a file representing past performance values of the injection molding machine 10 (an example of the first injection molding machine), but may read a file representing past performance values of another injection molding machine (an example of the second injection molding machine), which is displayed when the external storage saving list button 1614 is pressed down.

Furthermore, the present invention is capable of superimposing and displaying the waveform data indicating the past performance values of the sensors with the waveform data indicating the current performance values detected by the current sensors. This allows the user to determine the difference between the currently detected waveform data and the past reference waveform data. As a result, the status being performed in the current process can be assumed by comparing with the status has been performed in the past. Therefore, appropriate quality control in the current process can be achieved.

As described above, embodiments of the injection molding machine according to the present invention have been described, but the present invention is not limited to the above-mentioned embodiments. Various modifications, corrections, substitutions, additions, deletions, and combinations are possible within the scope of the claims. They also naturally fall within the technical scope of the present invention.

The invention claimed is:

1. A controller of an injection molding machine comprising:

a processor configured to:

acquire signals from a detection device that detects an operation of the injection molding machine;

store, in a storage medium, a file representing a past performance value which is a detection result of operations of the injection molding machine or of another injection molding machine and is acquired before receiving a manipulation received by an operating device;

read the file representing the past performance value from the storage medium in accordance with the manipulation received by the operating device; and output a screen including first waveform information that represents a change of the past performance value that is acquired before receiving the manipulation and indicated in the file that is read from the processor and second waveform information that represents a change of a real-time performance value of a process that is currently set, said performance value being indicated by the signals acquired by the processor, wherein the first waveform information is generated based on information acquired from a first cycle of the injection molding and the second waveform information is generated based on information acquired from a second cycle of the injection molding, said second cycle of the injection molding being different from the first cycle of the injection molding, wherein the first waveform information is generated based on information acquired before the manipulation and the second waveform information is generated based on information acquired after the manipulation, wherein the first waveform information and the second waveform information are simultaneously displayed in the screen, wherein the manipulation includes receiving a user's selection of the file from among a plurality of files representing past performance values which are detection results of operations of the injection molding machine or of another injection molding machine and acquired before receiving the manipulation received by an operating device, and wherein the first waveform information is read from the selected file and is not real-time waveform information.

2. The controller of the injection molding machine according to claim 1, wherein the processor outputs the screen in which the first waveform information and the second waveform information are arranged in different display areas.

3. The controller of the injection molding machine according to claim 1, wherein the processor outputs the screen in which the first waveform information and the second waveform information are arranged in a predetermined display area so that the first waveform information and the second waveform information can be superimposed.

4. The controller of the injection molding machine according to claim 1, further comprising:

a display part configured to display the screen including the first waveform information indicated in the file read from the storage medium representing a change of the past performance value which is the detection result of operations of a first injection molding machine or a second injection molding machine and to display the second waveform information representing a change of performance value indicated by the signals acquired from the detection device that detects the operation of the injection molding machine.

5. The controller of the injection molding machine according to claim 1, wherein the processor is configured to read the file representing the past performance value which is the detection result of operations of the another injection molding machine from the storage medium in accordance with the manipulation received by the operating device.

6. An injection molding machine comprising:

a processor configured to:

acquire signals from a detection device;

store, in a storage medium, a file representing a past performance value which is a detection result of operations of the injection molding machine or of another injection molding machine and is acquired before receiving a manipulation received by an operating device;

read the file representing a past performance value from the storage medium in accordance with the manipulation received by the operating device; and output a screen including first waveform information that represents a change of the past performance value that is acquired before receiving the manipulation and indicated in the file that is read from the processor and second waveform information that represents a change of a real-time performance value of a process that is currently set, said performance value being indicated by the signals acquired by the processor, wherein the first waveform information is generated based on information acquired from a first cycle of the injection molding and the second waveform information is generated based on information acquired from a second cycle of the injection molding, said second cycle of the injection molding being different from the first cycle of the injection molding, wherein the first waveform information is generated based on information acquired before the manipulation and the second waveform information is generated based on information acquired after the manipulation, wherein the first waveform information and the second waveform information are simultaneously displayed in the screen, wherein the manipulation includes receiving a user's selection of the file from among a plurality of files representing past performance values which are detection results of operations of the injection molding machine or of another injection molding machine and acquired before receiving the manipulation received by an operating device, and wherein the first waveform information is read from the selected file and is not real-time waveform information.

7. A recording medium configured to record a program for a computer to execute a process, comprising:

acquiring signals from a detection device that detects an operation of an injection molding machine;

storing, in a storage medium, a file representing a past performance value which is a detection result of operations of the injection molding machine or of another injection molding machine and is acquired before receiving a manipulation received by an operating device;

reading the file representing a past performance value from the storage medium in accordance with the manipulation received by the operating device; and outputting a screen including first waveform information that represents a change of the past performance value that is acquired before receiving the manipulation and indicated in the file that is read by the reading and second waveform information that represents a change of a real-time performance value of a process that is currently set, said performance value being indicated by the signals acquired, wherein the first waveform information is generated based on information acquired from a first cycle of the injection molding and the second waveform information is generated based on information acquired from a second cycle of the injection molding, said second cycle of the injection molding being different from the first cycle of the injection molding, wherein the first waveform information is generated based on information acquired before the manipulation and the second waveform information is generated based on information acquired after the manipulation, wherein the first waveform information and the second waveform information are simultaneously displayed in the screen, wherein the manipulation includes receiving a user's selection of the file from among a plurality of files representing past performance values which are detection results of operations of the injection molding machine or of another injection molding machine and acquired before receiving the manipulation received by an operating device, and wherein the first waveform information is read from the selected file and is not real-time waveform information.

8. A controller of an injection molding machine comprising:

a processor configured to:

acquire signals from a detection device that detects an operation of the injection molding machine;

store, in a storage medium, a file representing a past performance value which is a detection result of operations of the injection molding machine or of another injection molding machine and is acquired before receiving a manipulation received by an operating device;

read the file representing a past performance value from the storage medium in accordance with a manipulation received by the operating device; and output a screen including first waveform information that represents a change of the past performance value that is acquired before receiving the manipulation and indicated in the file that is read by the processor and second waveform information that represents a change of a real-time performance value of a process that is currently set, said performance value being indicated by the signals acquired by the processor, said first waveform information being not updatable in real time and said second waveform information being updatable in real time, wherein the first waveform information is generated based on information acquired from a first cycle of the injection molding and the second waveform information is generated based on information acquired from a second cycle of the injection molding, said second cycle of the injection molding being different from the first cycle of the injection molding, wherein the first waveform information is generated based on information acquired before the manipulation and the second waveform information is generated based on information acquired after the manipulation, wherein the first waveform information and the second waveform information are simultaneously displayed in the screen, wherein the manipulation includes receiving a user's selection of the file from among a plurality of files representing past performance values which are detection results of operations of the injection molding machine or of another injection molding machine and acquired before receiving the manipulation received by an operating device, and wherein the first waveform information is read from the selected file and is not real-time waveform information.

9. A controller of an injection molding machine comprising:

a processor configured to:

acquire signals from a detection device that detects an operation of the injection molding machine;

store, in a storage medium, a file representing a past performance value which is a detection result of operations of the injection molding machine or of another injection molding machine and is acquired before receiving a manipulation received by an operating device;

read the file representing a past performance value from the storage medium in accordance with a manipulation received by the operating device; and output a screen including first waveform information that is non real-time data that represents a change of the past performance value that is acquired before receiving the manipulation and indicated in the file that is read from the processor and second waveform information that is real-time data that represents a change of a real-time performance value of a process that is currently set, said performance value being indicated by the signals acquired by the processor, wherein the first waveform information is generated based on information acquired from a first cycle of the injection molding and the second waveform information is generated based on information acquired from a second cycle of the injection molding, said second cycle of the injection molding being different from the first cycle of the injection molding, wherein the first waveform information is generated based on information acquired before the manipulation and the second waveform information is generated based on information acquired after the manipulation, wherein the first waveform information and the second waveform information are simultaneously displayed in the screen, wherein the manipulation includes receiving a user's selection of the file from among a plurality of files representing past performance values which are detection results of operations of the injection molding machine or of another injection molding machine and acquired before receiving the manipulation received by an operating device, and wherein the first waveform information is read from the selected file and is not real-time waveform information.

* * * * *